(12) United States Patent
Philip et al.

(10) Patent No.: US 10,541,855 B2
(45) Date of Patent: Jan. 21, 2020

(54) RESOURCE ALLOCATION METHODS AND APPARATUS

(71) Applicant: Ribbon Communications Operating Company, Inc., Westford, MA (US)

(72) Inventors: Prince Arimpur Cheerotha Philip, Bangalore (IN); Pendyala Satya Ravi Kiran, Bangalore (IN); Kumar Saurabh, Bangalore (IN); Yasaswy Ramachandra Avasarala, Visakhapatnam (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 130 days.

(21) Appl. No.: 15/491,255

(22) Filed: Apr. 19, 2017

(65) Prior Publication Data
US 2018/0227165 A1    Aug. 9, 2018

(30) Foreign Application Priority Data
Feb. 3, 2017    (IN) .............................. 201741004009

(51) Int. Cl.
*H04L 29/08*    (2006.01)
*G06F 9/50*    (2006.01)
(Continued)

(52) U.S. Cl.
CPC ...... *H04L 29/08144* (2013.01); *G06F 9/5077* (2013.01); *H04L 47/70* (2013.01);
(Continued)

(58) Field of Classification Search
CPC .......... H04L 29/08144; H04L 41/0896; H04L 43/0817; H04L 47/70; H04L 47/748;
(Continued)

(56) References Cited

U.S. PATENT DOCUMENTS

| 2002/0107026 A1* | 8/2002 | Agrawal ................. H04L 47/11 455/453 |
| 2010/0046535 A1* | 2/2010 | Bugenhagen ....... H04L 65/1046 370/401 |

(Continued)

FOREIGN PATENT DOCUMENTS

| CN | 101448240 A | * | 6/2009 |
| CN | 104539558 A | * | 4/2015 |

*Primary Examiner* — Zi Ye
(74) *Attorney, Agent, or Firm* — Straub & Straub; Stephen T. Straub; Michael P. Straub

(57) ABSTRACT

An individual session border controller in a cluster of SBCs, e.g., in a Cloud, sends a resource utilization reporting message to the current master resource manager for the cluster. In response to the received utilization reporting message from the individual SBC, the master resource manager determines a mode of operation, e.g. one of: normal, critical or overshoot, for the cluster and a resource allocation for the SBC, the resource allocation method used being different for at least two different modes. The master resource manager communicates the determined cluster mode and the determined resource allocation to the individual SBC, e.g., in a response message. The SBC controls its resource utilization reporting rate as a function of the mode. In at least one mode, e.g., normal mode, the SBC is allowed to use more resources, e.g., X % more, than the amount of resources allocated to the SBC by the master resource manager.

20 Claims, 20 Drawing Sheets

(51) Int. Cl.
  *H04L 12/911* (2013.01)
  *H04L 29/06* (2006.01)
(52) U.S. Cl.
  CPC ...... *H04L 67/1002* (2013.01); *H04L 67/1008* (2013.01); *H04L 29/06* (2013.01); *H04L 67/10* (2013.01)
(58) Field of Classification Search
  CPC .............. H04L 47/822; H04L 67/1002; H04L 67/1008; G06F 9/5077
  USPC ....................................................... 709/226
  See application file for complete search history.

(56) References Cited

U.S. PATENT DOCUMENTS

2014/0019622 A1* 1/2014 Khasnabish ............ H04L 67/10 709/226
2015/0229562 A1* 8/2015 Jenkins ................ H04L 45/306 370/218

* cited by examiner

| SBC INSTANCE ID | USAGE REPORTED AT Tn INTERVAL | USAGE REPORTED AT Tn+1 INTERVAL | TOTAL USAGE AS OF NOW | ALLOCATED CALL LIMITS | USAGE REPORTED AT Tn+2 INTERVAL | TOTAL USAGE AS OF NOW | ALLOCATED CALL LIMITS | USAGE REPORTED AT Tn+3 INTERVAL | TOTAL USAGE AS OF NOW | ALLOCATED CALL LIMITS | USAGE REPORTED AT Tn+4 INTERVAL | TOTAL USAGE AS OF NOW | ALLOCATED CALL LIMITS |
|---|---|---|---|---|---|---|---|---|---|---|---|---|---|
| 1 | | | | | | | | 100 | 7900 | 127 | 100 | 8053 | 124 |
| 2 | 2400 | 2700 | 6800 | 3971 | 2650 | 7690 | 3446 | 2700 | 7950 | 3396 | 2700 | 8053 | 3353 |
| 3 | 1200 | 1500 | 7100 | 2113 | 1550 | 7740 | 2003 | 1600 | 8000 | 2000 | 1600 | 8053 | 1987 |
| 4 | 850 | 1000 | 7250 | 1379 | 1100 | 7840 | 1403 | 1150 | 8050 | 1429 | 1150 | 8053 | 1428 |
| 5 | 2050 | 2540 | 7740 | 3282 | 2500 | 7800 | 3205 | 2530 | 8082 | 3131 | 2550 | 8073 | 3159 |
| TOTALS | 6500 | | | 10744 | | | 10057 | | | 10083 | | | 10050 |

FIGURE 8

| SBC INSTANCE ID (902) | USAGE REPORTED AT Tn INTERVAL (904) | USAGE REPORTED AT Tn+1 INTERVAL (906) | TOTAL USAGE AS OF NOW (908) | ALLOCATED CALL LIMITS (910) | USAGE REPORTED AT Tn+2 INTERVAL (912) | TOTAL USAGE AS OF NOW (914) | ALLOCATED CALL LIMITS (916) | USAGE REPORTED AT Tn+3 INTERVAL (918) | TOTAL USAGE AS OF NOW (920) | ALLOCATED CALL LIMITS (922) | USAGE REPORTED AT Tn+4 INTERVAL (924) | TOTAL USAGE AS OF NOW (926) | ALLOCATED CALL LIMITS (928) |
|---|---|---|---|---|---|---|---|---|---|---|---|---|---|
| 1 (930) | 2100 | 2200 | 7100 | 3099 | 2300 | 7600 | 3026 | 2300 | 8125 | 2831 | 2300 | 7350 | 3129 |
| 2 (932) | 800 | 900 | 7200 | 1250 | 1100 | 7800 | 1410 | 0 | 7025 | 0 | 0 | 7350 | 0 |
| 3 (934) | 1300 | 1400 | 7100 | 1918 | 1500 | 7900 | 1899 | 1600 | 7125 | 2246 | 1600 | 7350 | 2177 |
| 4 (936) | 1500 | 1600 | 7300 | 2162 | 1725 | 8025 | 2150 | 1850 | 7250 | 2252 | 1900 | 7400 | 2568 |
| 5 (938) | 1300 | 1400 | 7400 | 1867 | 1500 | 8125 | 1846 | 1600 | 7350 | 2177 | 1650 | 7450 | 2215 |
| TOTALS (940) | 7000 | | | 10295 | | | 10331 | | | 9805 | | | 10088 |

FIGURE 9

| 1300 → 1302 | 1304 | 1306 |

| CURRENT SBC MASTER RM SERVER | | |
|---|---|---|
| CLUSTER MODE OF OPERATION (RESOURCE GROUP) | MODE DETERMINATION CRITERIA | METHOD USED FOR RESOURCE ALLOCATION TO CLIENT |
| NORMAL | DETERMINED REPORTED TOTAL RESOURCE UTILIZATION FOR CLUSTER < 80 % MAX RESOURCE LIMIT | FIRST METHOD |
| CRITICAL | 80% MAX RESOURCE LIMIT ≤ DETERMINED REPORTED TOTAL RESOURCE UTILIZATION FOR CLUSTER ≤ 100 % MAX LIMIT | FIRST METHOD |
| OVERSHOOT | DETERMINED REPORTED TOTAL RESOURCE UTILIZATION FOR CLUSTER > 100 % MAX RESOURCE LIMIT | SECOND METHOD INCLUDING OVERSHOOT FACTOR |

FIGURE 13

| 1400 → 1402 | 1404 | 1406 |

| SBC CLIENT MODULE | | |
|---|---|---|
| CLUSTER MODE OF OPERATION (RESOURCE GROUP) | RESOURCE UTILIZATION REPORTING RATE INTERVAL | AMOUNT OF RESOURCES THAT MAY BE USED BY CLIENT |
| NORMAL | T SEC | AMOUNT ALLOCATED BY MASTER RM SERVER TO CLIENT + X % EXTRA |
| CRITICAL | T/2 SEC | AMOUNT ALLOCATED BY MASTER RM SERVER TO CLIENT |
| OVERSHOOT | T/2 SEC | AMOUNT ALLOCATED BY MASTER RM SERVER TO CLIENT |

FIGURE 14

EXEMPLARY SET OF RESOURCE GROUPS FOR A CLUSTER OF SBCs, EACH RESOURCE GROUP WITH A DETERMINED MODE OF OPERATION

| RESOURCE GROUP ID | DESCRIPTION | MODE |
|---|---|---|
| FIRST RESOURCE GROUP | TRUNK GROUP A CALL LIMIT RESOUCES | FIRST RESOURCE GROUP MODE OF OPERATION |
| SECOND RESOURCE GROUP | TRUNK GROUP A BANDWIDTH RESOUCES | SECOND RESOURCE GROUP MODE OF OPERATION |
| THIRD RESOURCE GROUP | TRUNK GROUP B CALL LIMIT RESOURCES | THIRD RESOURCE GROUP MODE OF OPERATION |
| FOURTH RESOURCE GROUP | TRUNK GROUP B BANDWIDTH RESOURCES | FOURTH RESOURCE GROUP MODE OF OPERATION |

FIGURE 15

| FIRST RESOURCE GROUP (CALL LIMIT RESOURCE GROUP CORRESPONINDG TO TRUNK GROUP A) MODE OF OPERATION | SECOND RESOURCE GROUP (BANDWIDTH RESOURCE GROUP CORRESPONDING TO TRUNK GROUP A) MODE OF OPERATION | RESOURCE UTILIZATION REPORTING INTERVAL RATE |
|---|---|---|
| NORMAL MODE | NORMAL MODE | T SEC REPORTING INTERVAL |
| NORMAL MODE | CRITICAL MODE | T/2 SEC REPORTING INTERVAL |
| NORMAL MODE | OVERSHOOT MODE | T/2 SEC REPORTING INTERVAL |
| CRITICAL MODE | NORMAL MODE | T/2 SEC REPORTING INTERVAL |
| CRITICAL MODE | CRITIAL MODE | T/2 SEC REPORTING INTERVAL |
| CRITICAL MODE | OVERSHOOT MODE | T/2 SEC REPORTING INTERVAL |
| OVERSHOOT MODE | OVERSHOOT MODE | T/2 SEC REPORTING INTERVAL |

FIGURE 16

RESOURCE ALLOCATION METHODS AND
APPARATUS

RELATED APPLICATION

The present application claims the benefit of Indian Provisional Patent Application S.N. 201741004009 filed on Feb. 3, 2017 which is hereby expressly incorporated by reference in its entirety.

FIELD

Methods and apparatus related to resource allocation are described, and more particularly, methods and apparatus for efficiently allocating communications resources, e.g. in a cloud environment are described.

BACKGROUND

With the advent of Cloud computing, telecom vendors have begun the process of virtualizing their solution and making them cloud enabled so that they can be deployed in private and/or public clouds of telecom operators. Easy as it may seem, there are many challenges in deploying the solution "as is" in a cloud cluster.

Any Telecom Server (Switch, Gateway, SBC, etc.) will have a large number of resources for call handling, call routing, transcoding, etc. Some of the resources are call limit, license count, bandwidth, allowed number of transcoders, minimum call Key Parameter Index (KPI) required, etc.

One of the fundamental challenges faced in a Cloud based distributed environment is that of resource distribution among the different Nodes that make up the cloud cluster.

In a single box model deployment of a network function, the box has full information about resource utilization (e.g.: call count) hence applying resource management (e.g.: Call Admission Control) is straight forward. But in a cloud environment, a network function typically will be composed of many instances of network function working in tandem. To apply resource management efficiently, each network function needs to know the current resource count (e.g.: current call count) in the whole cluster at that moment. However, getting real time resource utilization information in cloud is difficult because of the inherent distributed nature of the cloud. This problem is further compounded by the fact that the cloud cluster can scale-in or scale-out based on the traffic.

Some approaches that can be adopted for Cloud based Resource Management are listed below, each approach has problems and/or limitations. One approach is to statistically distribute resources across the cloud. However, since it is not guaranteed that the traffic will come uniformly to all instances, there may be many call rejections even much before the configured max call limit is reached. In another approach a central entity is deployed to keep track of resource usage count across the cloud. In this approach each instance requests to the central entity whether to proceed or reject a call. This approach will introduce a significant amount of delay with regard to call processing. In yet another approach entities synch their usage to one another. In this approach where each instance synchs its resource usage count to all other instances in the Cloud, in a frequent manner, there will build up a lot of intra cloud messages for supporting resource management.

Based on the above discussion there is a need for new methods and apparatus for supporting resource management, e.g., in a Cloud environment. It would be advantageous if at least some of these new methods and apparatus implemented efficient resource management in environments where non-uniform traffic may be expected, with relatively small call processing delays, and/or without a lot of control messaging being required.

SUMMARY

Methods and apparatus for efficiently allocating communications resources are described. Exemplary described methods and apparatus, in accordance with the present invention, are well suited for efficiently allocating limited communications resources in a cloud environment including a cluster of Telecom entities, e.g., a cluster of session border controllers (SBCs). Exemplary communications resources which may be allocated, in accordance with methods of the present invention, include, e.g., call limit, bandwidth, license count, allowed number of transcoders, minimum call KPI required, etc.

An exemplary method, in accordance with the present invention, provides a mechanism to solve the resource distribution problem in a cloud cluster of nodes, e.g., SBCs. Various advantages of the novel methods and apparatus, in accordance with present invention, are described below. Various exemplary resource allocation and distribution, methods, in accordance with various embodiments of the present invention, work well, e.g., efficiently, with either uniform or random traffic. Various exemplary resource allocation and distribution, methods, in accordance with various embodiments of the present invention, do not introduce delay to call processing. Various exemplary resource allocation and distribution, methods, in accordance with various embodiments of the present invention do not introduce a lot of intra cloud messages for resource control, e.g., the approach is a low overhead or very efficient control signaling approach. Various exemplary resource allocation and distribution methods, in accordance with various embodiments of the present invention, do not cause intra cloud messaging to increases linearly with the increase in call load and trunk group count.

Exemplary described novel methods of resource management, in accordance with the present invention, are well suited to be used to manage many different kinds of resources, e.g., call limit, bandwidth, license count, etc., e.g., in a Cloud. Various exemplary methods and apparatus in accordance with the present invention are described in the context of Call Admission Control (CAC) performed by resource management with a focus on 'call limit' as the resource, and the resource being allocated to Session Border Controllers (SBCs) in a cluster of SBCs in a communications system. However, the described methods and apparatus are also well suited for managing resources used by other Telecom entities or devices, e.g., Switches, Gateways, etc., e.g., in clusters.

An individual session border controller in a cluster of SBCs, e.g., in a Cloud, sends a resource utilization reporting message to the current master resource manager for the cluster. In response to the received utilization reporting message from the individual SBC, the master resource manager determines a mode of operation, e.g. one of: normal, critical or overshoot, for the cluster and a resource allocation for the individual SBC, the resource allocation method used being different for at least two different modes. The master resource manager communicates the determined cluster mode and the determined resource allocation to the individual SBC, e.g., in a response message. The SBC controls its resource utilization reporting rate as a function of the mode. In at least one mode, e.g., normal mode, the SBC is allowed to use more resources, e.g., X % more, than the amount of resources allocated to the SBC by the master resource manager.

An exemplary method of managing resources in a communications system, in accordance with some embodiments, includes: operating a first resource manager, of a first session border controller as a master resource manager, for a plurality of session border controllers in a cluster of session border controllers, said first session border controller being one of the plurality of session border controllers in said cluster, operating the first resource manager including: receiving, at the first resource manager, resource utilization reporting messages from session border controllers in said cluster, said resource utilization reporting messages includes resource utilization information; determining, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to first said resource manager at a faster rate than during said normal mode of operation and during which the session border controllers reject any resource allocation requests requesting resources in the first resource group that would require a resource allocation exceeding an allocation limit assigned to an individual session border controller performing a resource allocation; and communicating the determined mode of operation for the first resource group to one or more session border controllers in said cluster.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 8 is an exemplary table used to describe a cluster scale out scenario in which a new SBC node gets added to a cluster in accordance with an exemplary embodiment.

FIG. 9 is an exemplary table used to describe a cluster scale in scenario in which a SBC node in the cluster gets aborted or terminated in accordance with an exemplary embodiment.

FIG. 13 is a drawing of exemplary information table corresponding to a currently elected master RM server for a cluster of SBCs, in accordance with an exemplary embodiment.

FIG. 14 is a drawing of exemplary information table corresponding to an RM client module of an SBC in a cluster of SBCs, in accordance with an exemplary embodiment.

FIG. 15 is a drawing of an exemplary table used to describe an embodiment in which a cluster of SBCs has multiple resource groups and sets of those resource groups corresponding to different trunk groups (TGs).

FIG. 16 is a drawing of an exemplary table corresponding to an SBC client mode for an exemplary embodiment in which the SBC receives mode information corresponding to two different resource type groups corresponding to the same trunk group, and determines a resource utilization reporting interval as a function of the mode information.

DETAILED DESCRIPTION

Figure 1:
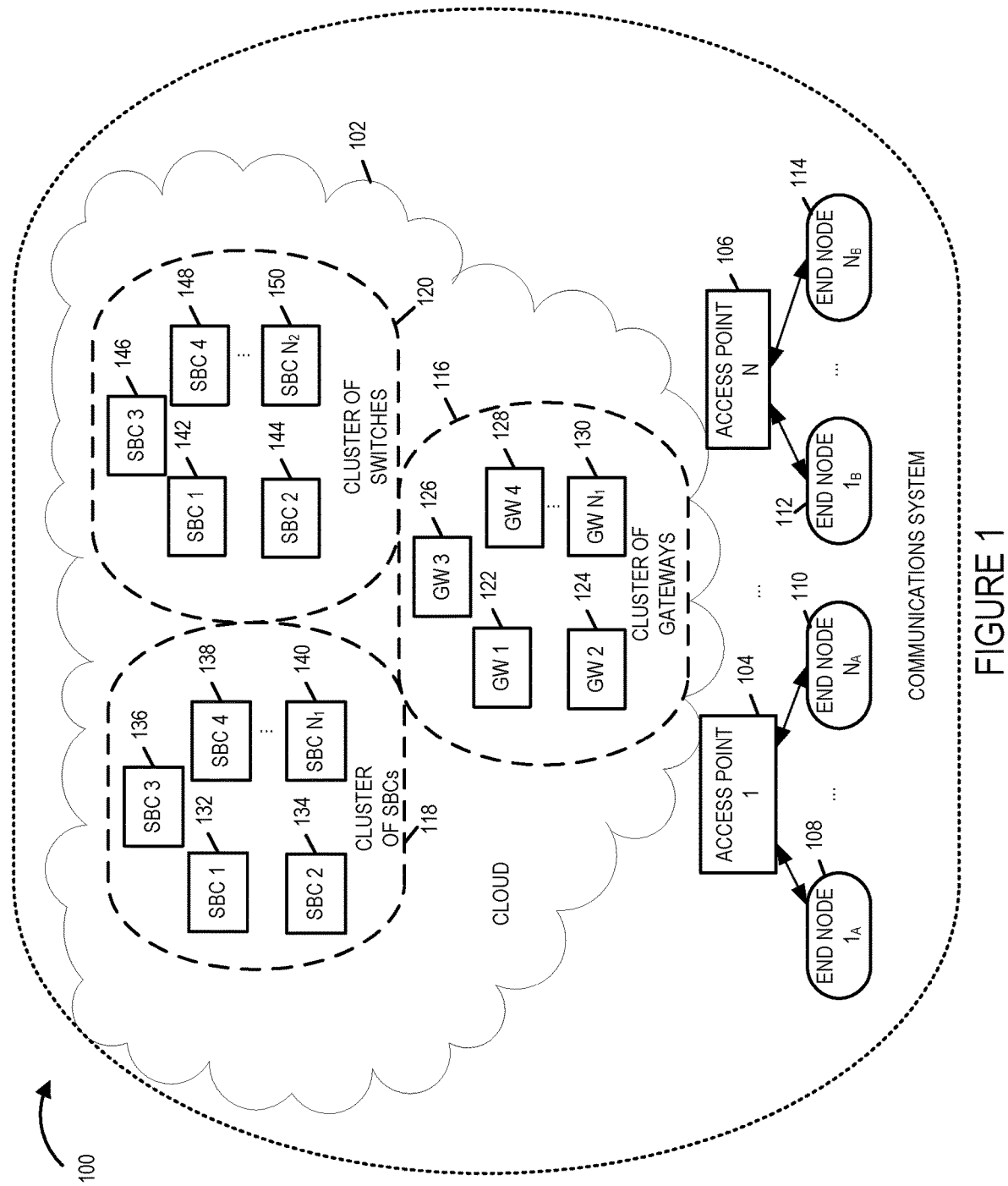
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a cloud 102, and a plurality of access points (access point 1

104, . . . , access point N 106). Cloud 102 includes a cluster 116 of gateways (GW 1 122, GW 2 124, GW 3 126, GW 4 128, . . . , GW $N_1$ 130, a cluster 118 of session border controllers (SBC 1 132, SBC 2 134, SBC 3 136, SBC 4 138, . . . , SBC $N_2$ 140), and a cluster 120 of switches (switch 1 142, switch 2 144, switch 3 146, switch 4 148, . . . , switch $N_3$ 150). The various devices (access points, SBCs, switches, and gateways) may be coupled together via wired, optical, and/or wireless communications links. Exemplary communications system 100 further includes a plurality of end nodes ((end node $1_A$ 108, . . . , end node $N_A$ 110, end node $1_B$ 112, . . . end node $N_B$ 114)). The end nodes, e.g., user devices, include mobile communications devices and stationary communications devices. An end node, e.g., end node 108, may communicate with an access point via a wired, optical and/or wireless communications link.

A cluster of Telecom nodes, e.g., cluster 118 of SBCs, cluster 116 of gateways, or cluster 120 of switches, implements a resource management method in accordance with the present invention.

Figure 2:
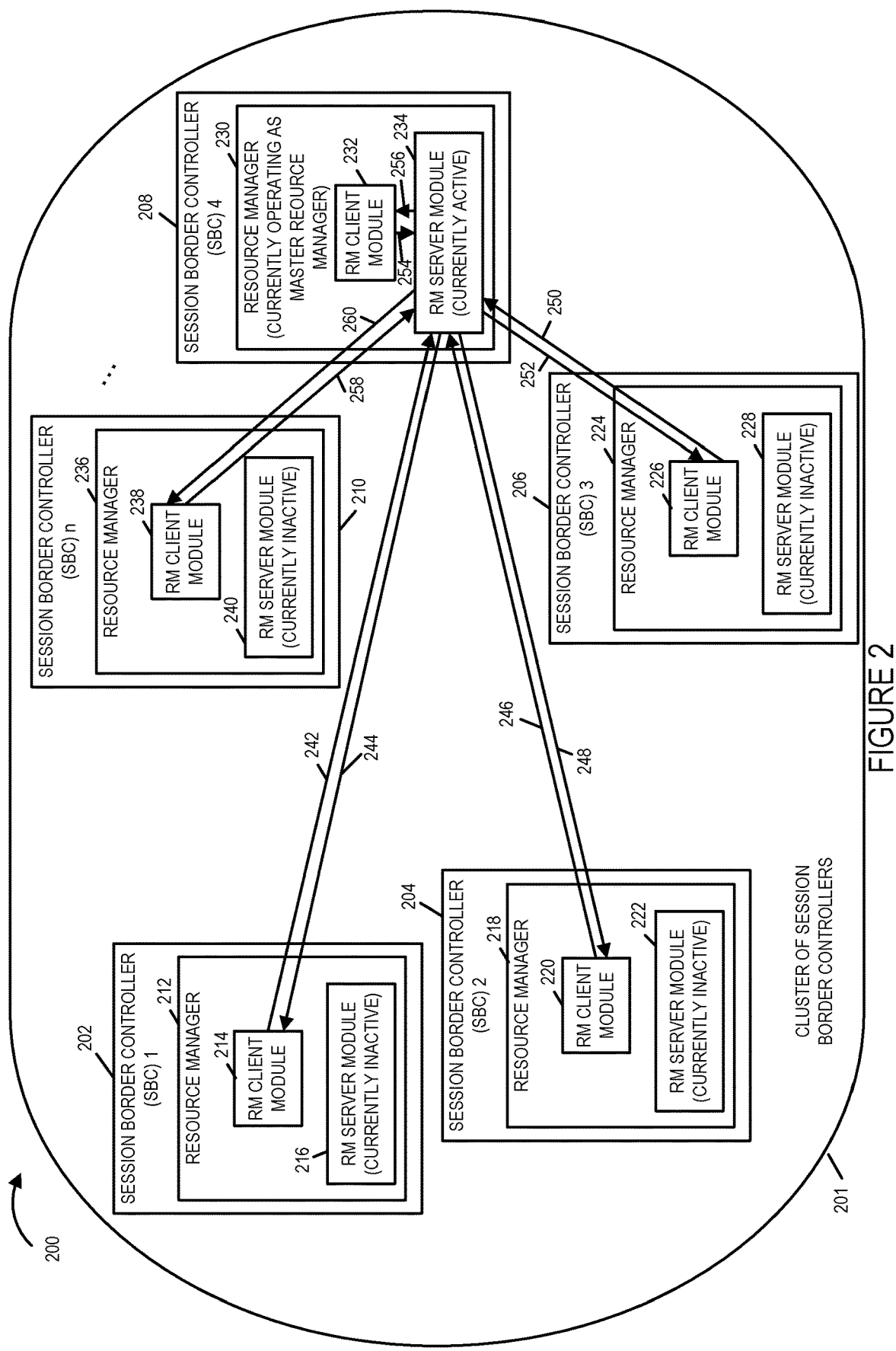
FIG. 2 is a drawing illustrating an exemplary cluster of session border controllers (SBCs) in accordance with an exemplary embodiment.

FIG. 2 is a drawing 200 illustrating an exemplary cluster 201 of session border controllers (SBCs) in accordance with an exemplary embodiment. Exemplary cluster 201 is, e.g., exemplary cluster 118 of FIG. 1. The exemplary cluster 201 of session border controllers includes a plurality of session border controllers (SBC 1 202, SBC 2 204, SBC 3 206, SBC 4 208, . . . , SBC n 210). Exemplary cluster 201 is, e.g., exemplary cluster 118 of FIG. 1, with SBCs (202, 204, 206, 208, . . . , 210) being the same as SBCs (132, 134, 136, 138, . . . , 140), respectively of FIG. 1. Each session border controller (SBC 1 202, SBC 2 204, SBC 3 206, SBC 4 208, . . . , SBC n 210) includes a resource manager (RM 212, RM 218, RM 224, RM 230, . . . , RM 236), respectively. Each resource manager (RM 212, RM 218, RM 224, RM 230, . . . , RM 236) includes a resource manager client module and a resource manager server module ((RM client module 214, RM server module 216), (RM client module 220, RM server module 222), (RM client module 226, RM server module 228), (RM client module 232, RM server module 234), . . . , (RM client module 238, RM server module 240), respectively.

In this exemplary embodiment, a central Resource Management server module, e.g., a RM server, manages resources, e.g., call limit resources, for the entire cluster 201. A RM server module (216, 222, 228, 234, . . . , 240) is included in each of the SBC instances (SBC 1 202, SBC 2 204, SBC 3 206, SBC 4 208, . . . , SBC n 210). In the exemplary embodiment, at any point in time, there will be only one 'Active' Resource Management Server in a cluster. As shown in drawing 200 of FIG. 2, RM server module 234 is the currently the active resource management server of cluster 201, while the other RM server modules (216, 222, 228, 240) are currently inactive. In the exemplary embodiment, the 'Active' Resource Management server is elected, e.g., RM server module 234 has previously been elected.

Each SBC instance (SBC 1 202, SBC 2 204, SBC 3 206, SBC 4 208, . . . , SBC n 210) has a Resource Management Client module (RM Client module 214, RM client module 220, RM client module 226, RM client module 232, . . . , RM client module 238)), respectively, responsible for doing call admission control (CAC) checks. Resource Management Clients will register with the 'Active' Resource Management Server when the SBC boots up.

As part of Registration, the active Resource Management Server, e.g., RM server module 234, will give some resource allocation, e.g., some call limit allocation, to each Resource Management Client (214, 220, 226, 232, . . . , 238). In one exemplary embodiment, the allocation amount depends on the current free limit, where free limit=Max limit−current total usage). Allocation given at the time of registration=Free limit/number of Instances.

Each of the RM client modules (214, 220, 226, 232, . . . , 238) of SBC instances (202, 204, 206, 208, . . . , 210) will periodically, e.g., in every T sec, report their resource usage, e.g., usage of call limit. The central Resource Management Server, e.g., RM server module 234, will calculate the amount of resources, e.g., call limit to be granted to the SBC based on the usage reported. The resource allocation, e.g., allocated call limit, will be conveyed in the response message. An SBC instance, e.g., SBC 1 202, should use this resource allocation, e.g., call limit, for applying CAC until the next T second interval. At the end of the T second interval, the Resource Management Client, e.g., RM client module 214, will send a new usage report to the active Resource Management Server, e.g., RM server module 234, with the current usage of call limit.

Resource utilization reporting messages (242, 246, 250, 254, . . . , 258) are generated and sent from RM client modules (214, 220, 226, 232, . . . , 238), respectively, to active RM server module 234. RM server module 234, which is the master, generates and sends response messages (244, 248, 252, 256, . . . , 260) to RM client modules (214, 220, 226, 232, . . . , 238), in response to received messages (242, 246, 250, 254, . . . , 258), respectively, each response message including a resource allocation for the SBC to which the response is directed.

In one exemplary embodiment, the active Resource Management Server, e.g. RM server module 234, uses the following method to calculate the allocation amount.

Allocation amount=(SBC reported usage/Total Cluster level usage)*Max Resource limit In one exemplary embodiment, e.g., where the resource being allocated is call limit, Max Resource limit is Max call limit.

Total Cluster Level Usage=$\Sigma_{i=1}^{n}$ Reported Usage SBC i,

Each time a SBC of the cluster reports its usage, the active Resource Management Server, e.g., RM server 234, calculates a latest 'Total Cluster level Usage'. This parameter, Total Cluster Level Usage, does not depend on any interval timer. Interval T is applicable at Resource Management Clients (214, 220, 226, 232, . . . , 238) and is used by the RM clients (214, 220, 226, 232, . . . , 238) to decide when to send next resource utilization report.

In some embodiments, an SBC instance reporting more usage may, and sometimes does, get higher allocation, and an SBC instance reporting less usage may, and sometimes does, get lower allocation.

Figure 3:
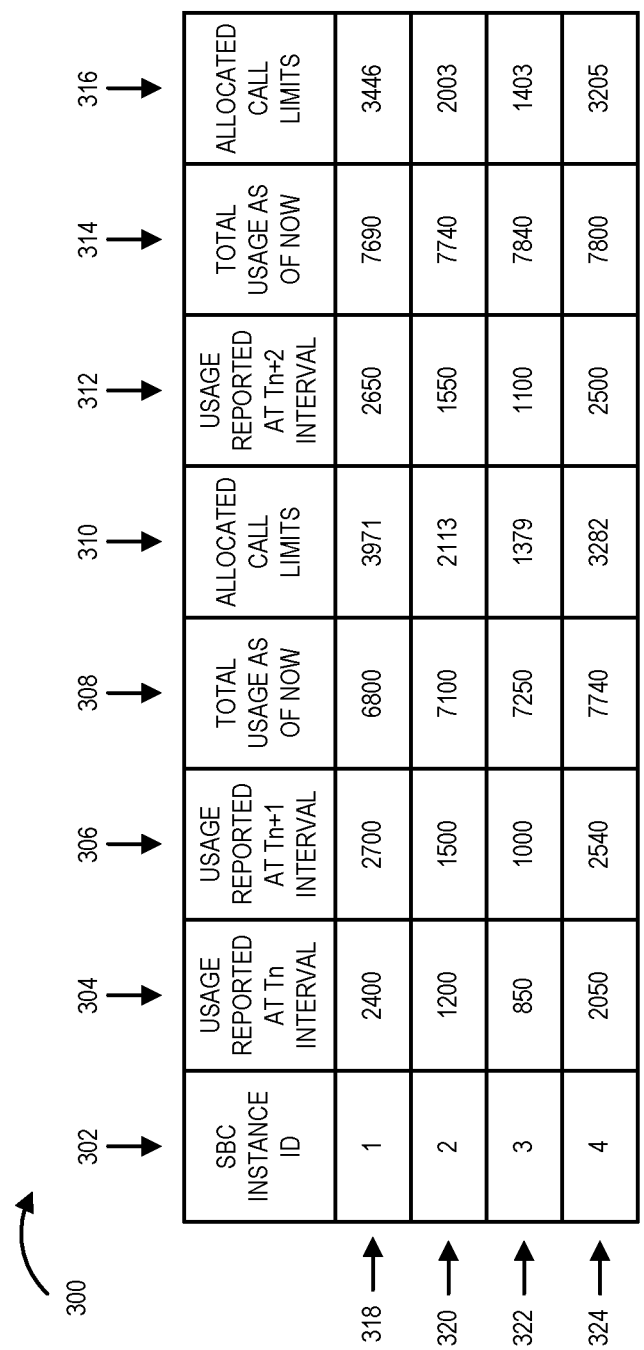
FIG. 3 is a drawing of a table used to illustrate exemplary first resource allocation method corresponding to normal mode in accordance with an exemplary embodiment.

FIG. 3 is a drawing 300 of a table used to illustrate one or more features of exemplary resource management in an example of a running system corresponding to a cluster of SBCs with 4 SBC instances in accordance with an exemplary embodiment. First column 302 indicates SBC instance ID. Second column 304 indicates usage reported at Tn interval. Third column 306 indicates usage reported at Tn+1 interval. Fourth column 308 indicates total usage as of now. Fifth column 310 indicates allocated call limits. Third, fourth and fifth columns (306, 308, 310) form a set. Sixth column 312 indicates usage reported at Tn+2 interval. Seventh column 314 indicates total usage as of now. Eighth column 316 indicates allocated call limits. Sixth, seventh, and eighth columns (312, 314, 316) form a set.

Row 318 shows information corresponding to SBC instance with ID1. Row 320 shows information corresponding to SBC instance with ID2. Row 322 show information corresponding to SBC instance with ID3. Row 324 show information corresponding to SBC instance with ID4.

On the exemplary running system, e.g., including a cluster with 4 SBC instances, at an exemplary moment, the resource allocation to each SBC instance for one specific trunk group (TG) may look like a set of information, e.g., a set of allocated call limits, included in the table of FIG. 3.

For this example, assume a trunk group (TG) max limit as 10000, e.g., 10000 calls maximum for the cluster, and assume at Tn interval (the previous interval) the Total Cluster level usage was 6500. The sum of the values in column 304 is 6500.

Assume the SBC Instance with ID=1 reports usage of 2700 calls (row 318, column 306). For the SBC Instance with ID1, Allocation amount=(SBC reported usage/Total Cluster level usage)*Max resource limit, where Total Cluster level usage=6500−2400 (row 318, column 306)+2700 (row 318, column 306)=6800 (row 318, column 308)

Allocation amount for SBC with ID 1=(2700/6800)*10000=3971 (row 310, column 310)

Next, the SBC Instance with ID=2 reports usage of 1500 calls (row 320, column 306).

Total Cluster level usage=6800 (row 318, column 308)−1200 (row 320, column 304)+1500 (row 320, column 306)=7100 (row 320, column 308);

Allocation amount for SBC with ID 2=(1500/7100)*10000=2113 (row 320, column 310)

Next, the SBC Instance with ID 3 reports usage of 1000 calls (row 322, column 306).

Total Cluster level usage=7100 (row 320, column 308)−850 (row 322, column 304)+1000 (row 322, column 306)=7250 (row 322, column 308)

Allocation amount for SBC with ID3=(1000/7250)*10000=1379 (row 322, column 310)

Next, the SBC Instance with ID 4, reports usage of 2540 calls (row 324, column 306).

Total Cluster level usage=7250 (row 322, column 308)−2050 (row 324, column 304)+2540 (row 324, column 306)=7740 (row 324, column 308)

Allocation amount for SBC Instance with ID 4=(2540/7740)*10000=3282 (row 324, column 310).

Continuing with this example for the next interval (Tn+2), assume the TG max limit as 10000 and assume at Tn+1 interval (the previous interval) the Total Cluster level usage was 7740.

For the SBC Instance with ID 1, the SBC with ID 1 reports usage of 2650 calls (row 318, column 312).

Allocation amount=(SBC reported usage/Total Cluster level usage)*Max resource limit Total Cluster level usage=7740−2700+2650=7690 (row 318, column 314)

Allocation amount=(2650/7690)*10000=3446 (row 318, column 316)

For the SBC Instance with ID 2, the SBC with ID 2 reports usage of 1550 calls (row 320, column 312).

Total Cluster level usage=7690−1500+1550=7740 (row 320, colum314).

Allocation amount=(1550/7740)*10000=2003 (row 320, column 316).

For the SBC Instance with ID 3, the SBC with ID 3 reports usage of 1100 calls (row 322, column 314).

Total Cluster level usage=7740−1000+1100=7840 (row 322, column 314).

Allocation amount=(1100/7840)*10000=1403 (row 322, column 316)

For the SBC Instance with ID 4, the SBC with ID 4 reports usage of 2500 calls (row 324, column 312).

Total Cluster level usage=7840−2540+2500=7800 (row 324, column 314).

Allocation amount=(2500/7800)*10000=3205 (row 324, column 316).

In some embodiments, to better control and distribute the allocation amount when usage is more, different states, e.g., normal state, critical state, and overshoot state, have been defined and are used for a resource group, e.g., for a resource group correspond to a trunk group (TG), e.g., a call limit resource group corresponding to a trunk group. In one such embodiment when usage is below a first threshold, e.g., below 80%, the state is called 'NORMAL' state. When usage is above the first threshold, e.g., above 80%, and below 100%, the state is called 'CRITICAL' state. When usage is above 100%, the state is called 'OVERSHOOT' state.

The Resource Management Server determines the state of the resource group and will inform the resource group state, e.g., resource group state, to the Resource Management Clients in the response messages, e.g., indicating a mode of operation to be one of normal mode, critical mode, or overshoot mode corresponding to normal state, critical state, or overshoot state, respectively.

In some embodiments, when a resource group, e.g., a call limit resource group corresponding to a TG, is in CRITICAL or OVERSHOOT state, the Resource Management Clients will start reporting their usage every T/2 sec interval. Thus a Client operating in critical or overshoot mode with regard to a resource group sends resource utilization reports every T/2 seconds, while the same Client operating in normal mode with regard to the resource group, sends resource utilization reports every T seconds. In some embodiments, T is a predetermined value in the range of 5 to 40.

Figure 4:
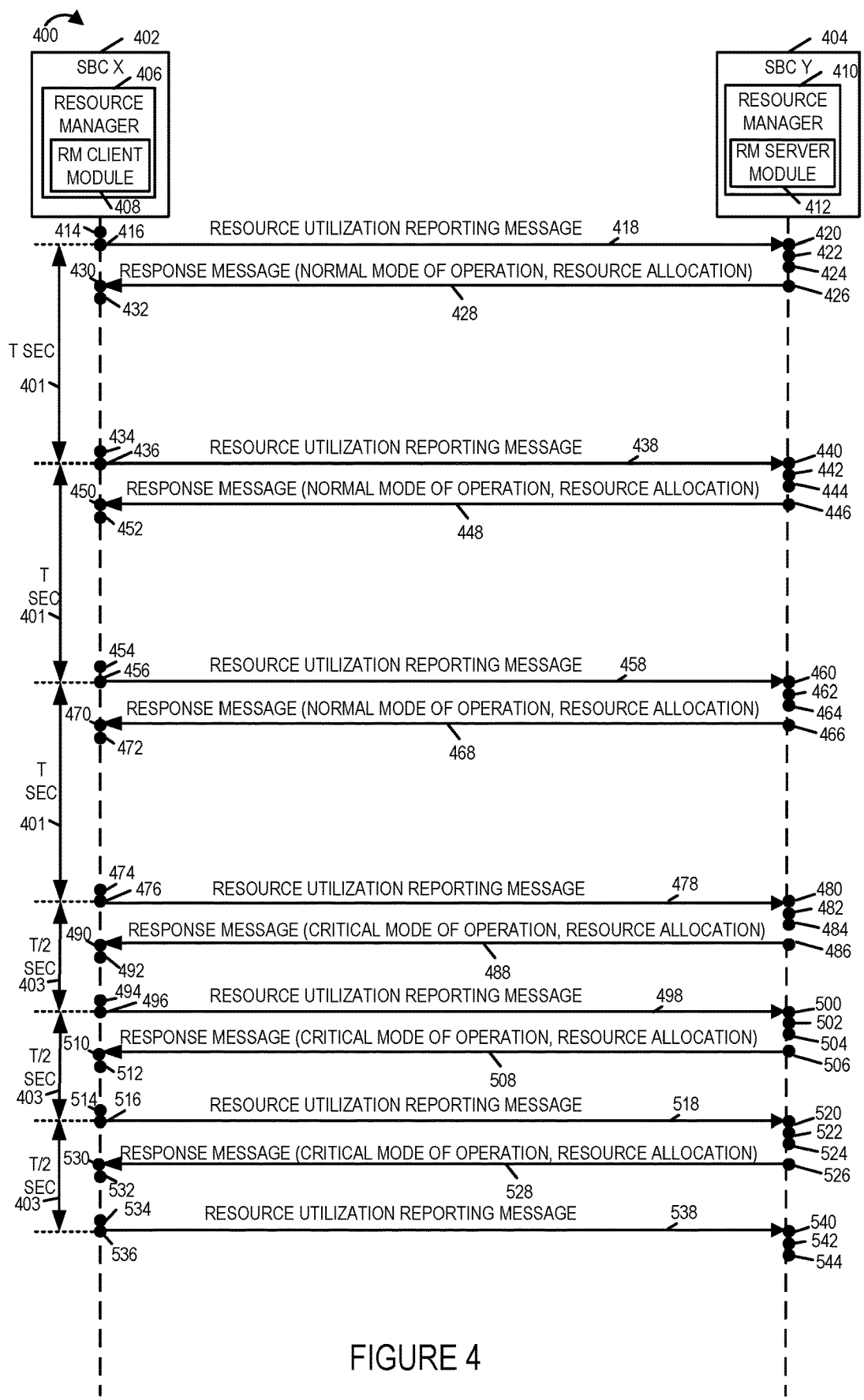
FIG. 4 is a drawing illustrating an exemplary mode change, from normal mode to critical mode, and a resource utilization reporting rate change, from a T second reporting interval to a T/2 second reporting interval, in response to the mode change in accordance with an exemplary embodiment.

FIG. 4 is a drawing 400 illustrating an exemplary mode change, from normal mode to critical mode, and a resource utilization reporting rate change, from a T second reporting interval to a T/2 second reporting interval, in response to the mode change in accordance with an exemplary embodiment. In FIG. 4, reporting from only one RM client module and responses to the one RM client module is shown, for simplicity; however, it should be appreciated that in general multiple RM clients corresponding to multiple SBCs of the cluster are reporting, e.g., asynchronously, to the RM server module 412 serving as master, with each report receiving a response.

Drawing 400 illustrates exemplary SBC X 402 and SBC Y 404. SBC X 402 includes resource manager 406 which includes RM client module 408. RM client module 408 generates resource utilization reporting messages and sends resource utilization reporting messages at a rate which is a function of the mode of operation. SBC Y 404 includes resource manager 410 including RM server module 412. Resource manager 410 of SBC Y 404 is currently operating as a master resource manager for a plurality of session border controllers in a cluster including SBC X 402 and SBC Y 404. RM server module 412 receives a resource utilization reporting message, determines a mode of operation, e.g. one of normal mode, critical mode and overshoot mode, determines resource allocation for the SBC which sent the reporting message, and generates and sends a response message in response to received resource utilization reporting message.

In step 414 SBC X 402 generates a resource utilization report message 418 including a resource utilization report for a resource group. In step 416 the SBC X 402 sends the generated resource utilization reporting message 418 to SBC Y 404. In step 420 SBC Y 420 receives the resource utilization reporting message 418 and recovers the communicated information. In step 422 SBC Y 404 determines a mode of operation as a function of the received resource utilization report. In one exemplary embodiment, SBC Y 406 determines a total cluster level usage and determines the mode of operation as a function of the total cluster level usage and a maximum resource limit. In this example, the determination of step 422 is that the mode of operation is to be the normal mode of operation. In step 424 SBC Y 404 determines a resource allocation for SBC X 402 as a function of the mode of operation, resource utilization information from the received resource utilization report of message 418, a total cluster level usage, and a maximum resource limit. In step 426, SBC Y 404 generates and sends response message 428, including information indicating the determined mode of operation of step 422, which is the normal mode of operation, and including the determined resource allocation of step 424, to SBC X 402. Response message 428 is received by SBC X 402 in step 430 and the communicated information of message 428 is recovered. In step 432 SBC 402 determines that it is to report resource utilization using a T second interval 401 since the mode is Normal mode.

In step 434 SBC X 402 generates a resource utilization reporting message 438 including another resource utilization report for the resource group. In step 436 the SBC X 402 sends the generated resource utilization reporting message 438 to SBC Y 404. In step 440 SBC Y 404 receives the resource utilization reporting message 438 and recovers the communicated information. In step 442 SBC Y 404 determines a mode of operation as a function of the received resource utilization report. In this example, the determination of step 442 is that the mode of operation is to be the normal mode of operation. In step 444 SBC Y 404 determines a resource allocation for SBC X 402 as a function of the mode of operation, resource utilization information from the received resource utilization report of message 438, a total cluster level usage, and a maximum resource limit. In step 446, SBC Y 404 generates and sends response message 448, including information indicating the determined mode of operation of step 442, which is the normal mode of operation, and including the determined resource allocation of step 444, to SBC X 402. Response message 448 is received by SBC X 402 in step 450 and the communicated information of message 448 is recovered. In step 452 SBC 402 determines that it is to report resource utilization using a T second interval 401 since the mode is Normal mode.

In step 454 SBC X 402 generates a resource utilization report message 458 including another resource utilization report for the resource group. In step 456 the SBC X 402 sends the generated resource utilization reporting message 458 to SBC Y 404. In step 460 SBC Y 404 receives the resource utilization reporting message 458 and recovers the communicated information. In step 462 SBC Y determines a mode of operation as a function of the received resource utilization report. In this example, the determination of step 462 is that the mode of operation is to be the normal mode of operation. In step 464 SBC Y 404 determines a resource allocation for SBC X 402 as a function of the mode of operation, resource utilization information from the received resource utilization report of message 458, a total cluster level usage, and a maximum resource limit. In step 466, SBC Y 404 generates and sends response message 468, including information indicating the determined mode of operation of step 462, which is the normal mode of operation, and including the determined resource allocation of step 464, to SBC X 402. Response message 468 is received by SBC X 402 in step 470 and the communicated information of message 468 is recovered. In step 472 SBC 402 determines that it is to report resource utilization using a T second interval 401 since the mode is Normal mode.

In step 474 SBC X 402 generates a resource utilization report message 478 including another resource utilization report for the resource group. In step 476 the SBC X 402 sends the generated resource utilization reporting message 478 to SBC Y 404. In step 480 SBC Y 404 receives the resource utilization reporting message 478 and recovers the communicated information. In step 482 SBC Y 404 determines a mode of operation as a function of the received resource utilization report. In this example, the determination of step 482 is that the mode of operation is to be the critical mode of operation. In step 484 SBC Y 404 determines a resource allocation for SBC X 402 as a function of the mode of operation, resource utilization information from the received resource utilization report of message 478, a total cluster level usage, and a maximum resource limit. In step 486, SBC Y 404 generates and sends response message 488, including information indicating the determined mode of operation of step 482, which is the critical mode of operation, and including the determined resource allocation of step 484, to SBC X 402. Response message 488 is received by SBC X 402 in step 490 and the communicated information of message 488 is recovered. In step 492 SBC 402 determines that it is to report resource utilization using a T/2 second interval 403 since the mode is critical mode.

In step 494 SBC X 402 generates a resource utilization report message 498 including another resource utilization report for the resource group. In step 496 the SBC X 402 sends the generated resource utilization reporting message 498 to SBC Y 404. In step 500 SBC Y 404 receives the resource utilization reporting message 498 and recovers the communicated information. In step 502 SBC Y 404 determines a mode of operation as a function of the received resource utilization report. In this example, the determination of step 502 is that the mode of operation is to be the critical mode of operation. In step 504 SBC Y 404 determines a resource allocation for SBC X 402 as a function of the mode of operation, resource utilization information from the received resource utilization report of message 498, a total cluster level usage, and a maximum resource limit. In step 506, SBC Y 404 generates and sends response message 508, including information indicating the determined mode of operation of step 502, which is the critical mode of operation, and including the determined resource allocation of step 504, to SBC X 402. Response message 508 is received by SBC X 402 in step 510 and the communicated information of message 508 is recovered. In step 512 SBC 402 determines that it is to report resource utilization using a T/2 second interval 403 since the mode is critical mode.

In step 514 SBC X 402 generates a resource utilization report message 508 including another resource utilization report for the resource group. In step 516 the SBC X 402 sends the generated resource utilization reporting message 518 to SBC Y 404. In step 520 SBC Y 404 receives the resource utilization reporting message 518 and recovers the communicated information. In step 522 SBC Y 404 determines a mode of operation as a function of the received resource utilization report. In this example, the determination of step 522 is that the mode of operation is to be the critical mode of operation. In step 524 SBC Y 404 determines a resource allocation for SBC X 402 as a function of the mode of operation, resource utilization information from the received resource utilization report of message 518, a total cluster level usage, and a maximum resource limit. In step 526, SBC Y 404 generates and sends response message 528, including information indicating the determined mode of operation of step 522, which is the critical mode of operation, and including the determined resource allocation of step 524, to SBC X 402. Response message 528 is received by SBC X 402 in step 530 and the communicated information of message 528 is recovered. In step 532 SBC 402 determines that it is to report resource utilization using a T/2 second interval 403 since the mode is critical mode.

In step 534 SBC X 402 generates resource utilization report message 508 including another resource utilization report for the resource group. In step 536 the SBC X 402 sends the generated resource utilization reporting message 538 to SBC Y 404. In step 540 SBC Y 404 receives the resource utilization reporting message 538 and recovers the communicated information. In step 542 SBC Y 404 determines a mode of operation as a function of the received resource utilization report. In step 544 SBC Y 404 determines a resource allocation for SBC X 402 as a function of the mode of operation, resource utilization information from the received resource utilization report of message 518, a total cluster level usage, and a maximum resource limit.

In some embodiment, when in NORMAL state (normal mode), each SBC is allowed to use more resources, e.g., X % more resources than the allocated amount of resources. For example, in normal state an SBC is allowed to accept calls more than X % (normally set a 5%) of their call limit allocated amount which was previously communicated in a response message. This approach of allowing SBCs to use more resources than allocated in Normal state is to attempt to ensure that in a cluster level environment SBCs should not be under delivering.

If there is high bursty traffic when the resource group, e.g., a call limit resource group corresponding to a TG, is in NORMAL state (normal mode) with the SBC clients reporting resource utilization in T sec intervals and since there is an X % extra allowance, there may be, and sometimes is, overshoot of resource utilization, e.g., overshoot of accepted call count in cluster level.

But once a resource group, e.g. a call limit resource group corresponding to a TG, is running in CRITICAL state (critical mode) for some time, and then bursty traffic comes, the chances of overshoot are less likely since the Resource Management Clients will be already reporting in T/2 second intervals and there is no X % allowance when in the Critical state. The faster reporting interval of T/2 sec vs. T sec, facilitates quicker adjustments to allocations, since a response message including a determined resource allocation is sent in response to a resource utilization reporting message.

Figure 5:
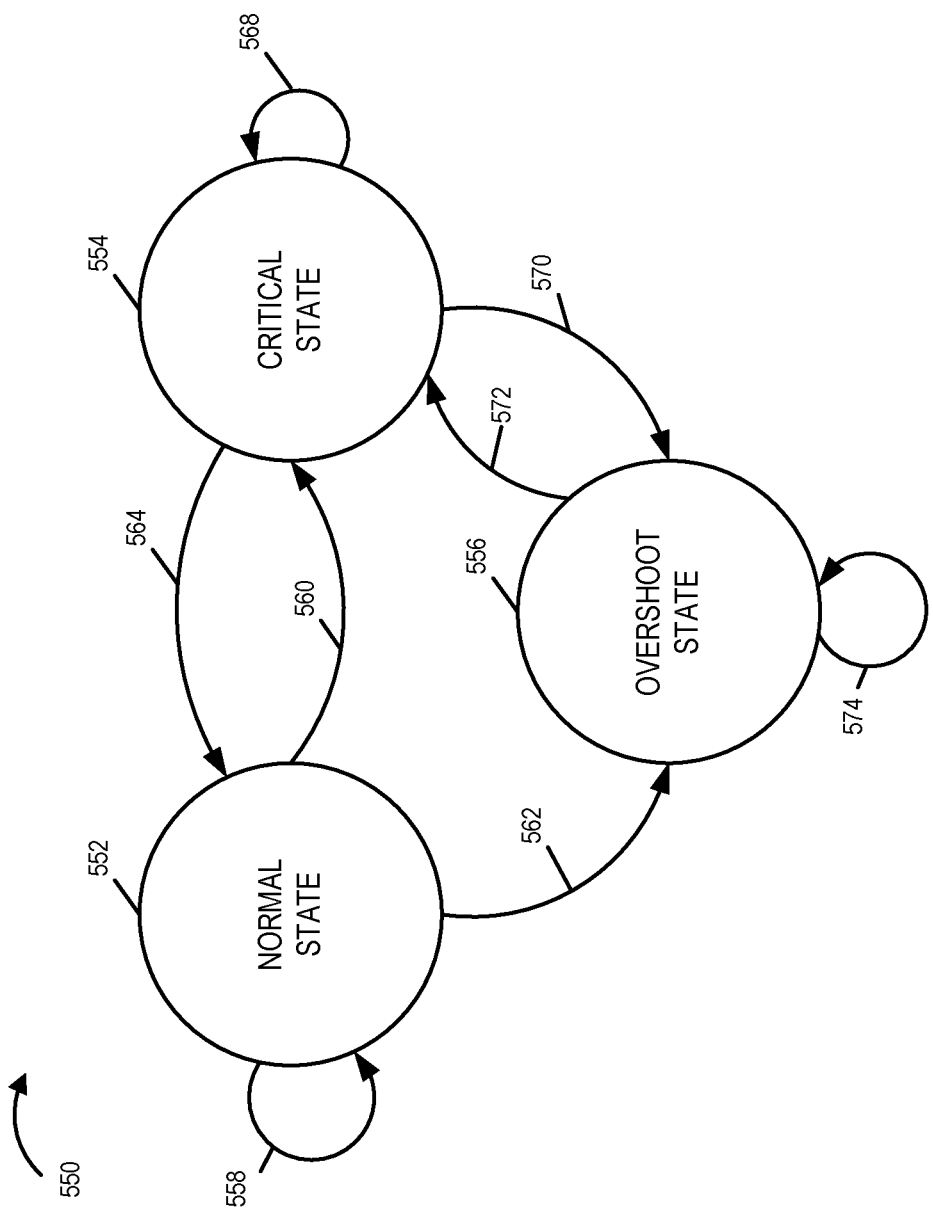
FIG. 5 is a drawing of a state diagram including 3 states, normal state, critical state and overshoot state, of SBC operation in accordance with an exemplary embodiment.

FIG. 5 is a drawing 550 of a state diagram including 3 states (normal state 552, critical state 554 and overshoot state 556) of SBC operation in accordance with an exemplary embodiment. Arrow 558 indicates that an SBC in normal state 552 may remain in normal state 552. Arrow 560 indicates a transition from normal state 552 to critical state 554. Arrow 562 indicates a transition from normal state 552 to critical state 554.

Arrow 568 indicates that an SBC in critical state 554 may remain in critical state 554. Arrow 564 indicates a transition from critical state 554 to normal state 552. Arrow 570 indicates a transition from critical state 554 to overshoot state 556.

Arrow 574 indicates that an SBC in overshoot state 556 may remain in overshoot state 556. Arrow 572 indicates a transition from overshoot state 556 to critical state 554. In this exemplary state diagram there is not a direct transition from overshoot state 556 to critical state. In some other embodiments, there is a possible direct transition from overshoot state to normal state.

In some embodiment, each state corresponds to a mode of operation, e.g., normal state to normal mode, critical state to critical mode and overshoot state to overshoot mode. In one exemplary embodiment, in normal state 552 the SBC, e.g., SBC client module, reports resource utilization every T seconds; in critical state 554 the SBC, e.g., SBC client module, reports resource utilization every T/2 seconds; and in overshoot state 556, the SBC, e.g., SBC client module, reports resource utilization every T/2 seconds. In various embodiments, in the normal state the SBC is allowed to use resource until X % above the allocated limit is reached where X is a positive number, e.g., X % above the allocated call limit. In critical state and overshoot state, the SBC does not use resources above the allocated limit, e.g., the SBC rejects any calls above its allocated call limit.

In some embodiments, in normal state the SBC reports resource utilization at a first rate; in critical state the SBC reports resource utilization at a second rate; and in overshoot state the SBC reports resource utilization at a third rate. In some such embodiments, the second rate is greater than the first rate. In some such embodiments, the second rate is at least twice the first rate. In some embodiments, the second and third rates are the same. In some other embodiments, the third rate is greater than the second rate.

In some embodiments, if overshoot occurs, a different method is used, e.g., by the RM server, for resource allocation in order to bring the resource utilization down.

For example, in one embodiment, if overshoot happens, a specific formula is used, e.g., including an overshoot factor, to bring down the cluster resource usage overshoot to a utilization level near to the max configured limit for the cluster by reducing each SBC's resource allocation. Thus the overshoot factor can be used to reduce the number of calls corresponding to a cluster and/or to bring down the amount of traffic corresponding to a cluster to a level near the maximum configured level, e.g., the desired level of resource usage for the resource group for the cluster.

In one embodiment, the formula used in response to a detected overshoot is:

New allocation=Reported Usage−Overshoot factor*0.5*Reported Usage; where,

Overshoot factor=(Total Cluster Level Usage−Max Limit)/Max Limit

In effect, the resource manager server is informing each SBC to reduce their usage by some percentage.

Figure 6:
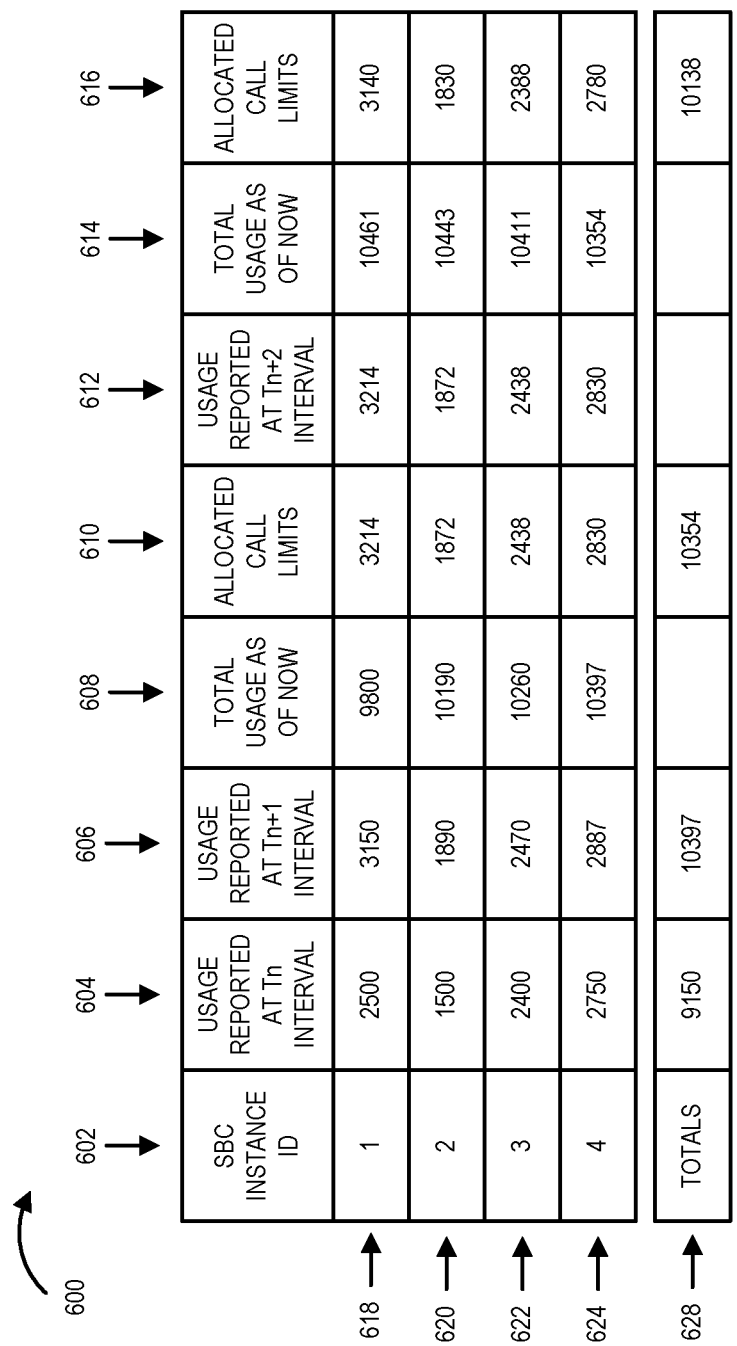
FIG. 6 is a drawing of a table used to illustrate in which a resource usage overshoot condition occurs, and the resource allocation method changes from the first resource allocation method to a second resource allocation method in accordance with an exemplary embodiment.

FIG. 6 is a drawing 600 of a table used to illustrate an example of a running system corresponding to a cluster with 4 SBC instances in which an overshoot condition occurs in accordance with an exemplary embodiment.

First column 602 indicates SBC instance ID. Second column 604 indicates usage reported at Tn interval. Third column 606 indicates usage reported at Tn+1 interval. Fourth column 608 indicates total usage as of now. Fifth column 610 indicates allocated call limits. Third, fourth and fifth columns (606, 608, 610) form a set. Sixth column 612 indicates usage reported at Tn+2 interval. Seventh column 614 indicates total usage as of now. Eighth column 616 indicates allocated call limits. Row 618 shows information corresponding to SBC instance with ID1. Sixth, seventh and eighth columns (612, 614, 618) form a set. Row 620 shows information corresponding to SBC instance with ID2. Row 622 shows information corresponding to SBC instance with ID3. Row 624 shows information corresponding to SBC instance with ID4. Row 628 shows totals for various columns.

On an exemplary running system, e.g., including a cluster with 4 SBC instances, at an exemplary moment, the resource allocation to each SBC instance for one call limit resource group, e.g., corresponding to specific trunk group (TG), may look like information, e.g., a set of information, e.g., a set of allocated call limits, shown in the table of FIG. 6.

For this example, assume for the resource group of call limit corresponding to the trunk group (TG), a max limit as 10000, e.g., 10000 calls maximum for the cluster of SBCs corresponding to the TG, and assume at Tn interval (the previous interval), the Total Cluster level usage was 9150 calls. The sum of the values (2500, 1500, 2400, 2750) in column 604 is 9100 (row 628, column 604).

During the Tn interval, SBC with ID=1 reported a usage of 2500; SBC with ID=2 reported a usage of 1500; SBC with ID=3 reported a usage of 2400; SBC with ID=4 reported a usage of 2750. Each of the SBCs reported their usage at different times.

Therefore for the Tn interval the total reported usage was 9500, since 2500+1500+2400+2750=9150.

For Tn+1 interval, when SBC with ID=1 reported its usage of 3150 calls (row 618, column 606), the total usage is 9800, since total usage=9150−2500+3150=9800. (row 618, column 608)

The normal mode formula is applied for resource allocation since the calculated total usage of 9800 is less than the max limit of 10000, and hence the SBC with ID=1 gets still a higher allocation than what is reported; the allocated call limit is 3214 (row 618, column 610).

In particular for the SBC Instance with ID 1,

Allocation amount=(SBC reported usage/Total Cluster level usage)*Max resource limit Total Cluster level usage=9150−2500+3150=9800

Allocation amount=(3150/9800)*10000=3214

However, when SBC with ID=2 reports its usage of 1890 (row 620, column 606), the total usage became 10190 (row 620, column 608), since 9800−1500+1890=10190. Since the calculated total usage is now >max limit of 10000, an overshoot condition has occurred, and the current master RM server starts applying the overshoot formula used to calculate resource allocation for the SBC clients. The overshoot factor is calculated and resource allocation for SBC with ID=2 is calculated using the new allocation formula which is a function of the determined overshoot factor.

Overshoot factor=(Total Usage−Max Limit)/Max Limit

Overshoot factor=(10190−10000)/10000=0.019

New allocation=Reported usage−Overshoot factor*0.5*Reported Usage

New allocation=1890−0.019*0.5*1890=1872 (row 620, column 610)

When SBC with ID=3 reports its usage of 2470 (row 622, column 606), the total usage became 10260 (row 622, column 608), since 10190−2400+2470=10260. Since the calculated total usage is still >max limit of 10000, an overshoot condition remains, and the master RM server applies the overshoot formula used to calculate resource allocation for the SB client of SBC with ID=3. The overshoot factor is calculated and resource allocation for SBC with ID=3 is calculated using the new allocation formula which is a function of the determined overshoot factor.

Overshoot factor=(Total Usage−Max Limit)/Max Limit

Overshoot factor=(10260−10000)/10000=0.026

New allocation=Reported usage−Overshoot factor*0.5*Reported Usage

New allocation=2470−0.026*0.5*2470=2438 (row 622, column 610)

When SBC with ID=4 reports its usage of 2887 (row 624, column 606), the total usage became 10397 (row 624, column 608), since 10260−2750+2887=10397. Since the calculated total usage is still >max limit of 10000, an overshoot condition remains, and the master RM server applies the overshoot formula used to calculate resource allocation for the SB client of SBC with ID=4. The overshoot factor is calculated and resource allocation for SBC with ID=4 is calculated using the new allocation formula which is a function of the determined overshoot factor.

Overshoot factor=(Total Usage−Max Limit)/Max Limit

Overshoot factor=(10397−10000)/10000=0.0397

New allocation=Reported usage−Overshoot factor*0.5*Reported Usage

New allocation=2887−0.0397*0.5*2887=2830 (row 624, column 610)

The total allocation of resources, e.g., total allocated call limits, based on the reported usage information for the Tn+1 interval is 10354, since 3214+1872+2438+2830=10354.

Since the cluster is in overshoot state, SBCs will not be allowed to apply the extra X % on accepted calls. It means, in the next interval, the maximum the cluster can accept is 10354 calls. It can be seen that by end of next interval (Tn+2), the total allocation is 10138 (row 628, column 616).

The SBC usage reporting from each of the SBCs for the Tn+2 interval, total usage calculations, and allocated call limits will now be described.

When SBC with ID=1 reported its usage of 3214 (row 618, column 612), the total usage became 10461 (row 618, column 614), since 10397−3150+3214=10190. Since the calculated total usage is now >max limit of 10000, an overshoot condition exists, and the master RM server applies the overshoot formula used to calculate resource allocation for the SBC with ID=1. The overshoot factor is calculated and resource allocation for SBC with ID=1 is calculated using the new allocation formula which is a function of the determined overshoot factor.

Overshoot factor=(Total Usage−Max Limit)/Max Limit

Overshoot factor=(10461−10000)/10000=0.0461

New allocation=Reported usage−Overshoot factor*0.5*Reported Usage

New allocation=3214−0.0461*0.5*3214=3140 (row 618, column 616)

When SBC with ID=2 reports its usage of 1872 (row 620, column 610), the total usage became 10443 (row 620, column 614), since 10461−1890+1872=10443. Since the calculated total usage is now >max limit of 10000, an overshoot condition remains, and the master RM server applies the overshoot formula used to calculate resource allocation for the SBC with ID=2. The overshoot factor is calculated and resource allocation for SBC with ID=2 is calculated using the new allocation formula which is a function of the determined overshoot factor.

Overshoot factor=(Total Usage−Max Limit)/Max Limit

Overshoot factor=(10443−10000)/10000=0.0443

New allocation=Reported usage−Overshoot factor*0.5*Reported Usage

New allocation=1872−0.0443*0.5*1872=1830 (row 620, column 616)

When SBC with ID=3 reports its usage of 2438 (row 622, column 612), the total usage became 10441 (row 622, column 614), since 10443−2470+2438=10411. Since the calculated total usage is still >max limit of 10000, an overshoot condition remains, and the master RM server applies overshoot formula used to calculate resource allocation for the SB client of SBC with ID=3. The overshoot factor is calculated and resource allocation for SBC with ID=3 is calculated using the new allocation formula which is a function of the determined overshoot factor.

Overshoot factor=(Total Usage−Max Limit)/Max Limit

Overshoot factor=(10411−10000)/10000=0.0411

New allocation=Reported usage−Overshoot factor*0.5*Reported Usage

New allocation=2438−0.0411*0.5*2438=2388 (row 622, column 616)

When SBC with ID=4 reports its usage of 2830 (row 624, column 612), the total usage became 10354 (row 624, column 614), since 10411−2887+2830=10354. Since the calculated total usage is still >max limit of 10000, an overshoot condition remains, and the master RM server applies the overshoot formula used to calculate resource allocation for the SB client of SBC with ID=4. The overshoot factor is calculated and resource allocation for SBC with ID=4 is calculated using the new allocation formula which is a function of the determined overshoot factor.

Overshoot factor=(Total Usage−Max Limit)/Max Limit

Overshoot factor=(10354−10000)/10000=0.0354

New allocation=Reported usage−Overshoot factor*0.5*Reported Usage

New allocation=2830−0.0354*0.5*2830=2780 (row 624, column 616)

The total allocation of resources, e.g., total allocated call limits, based on the reported usage information for the Tn+2 interval is 10138, since 3140+1830+2388+2780=10138 (row 628, column 616).

In some embodiments, a RM client module which is not included in the same SBC as the current master RM server module, is informed of a cluster group mode of operation in a unicast response message, which was in response to a resource utilization message transmitted by the SBC including the client. Thus, in at least some embodiments, the master RM server does not broadcast cluster group mode of operation determination information to the entire cluster. Each of those clients waits for its response message, in response to its transmitted resource utilization message in accordance with the client's timing, to find out a current mode of operation for the cluster. However, in some embodiment, if the RM client module is included in the same SBC as the current master RM server module, that particular RM client module may be, and in some embodiments, is informed each time the master RM server module determines a different mode of operation for the cluster corresponding to the resource group, e.g., since the signaling for that client can be internal to the SBC. Thus the RM client module within the same SBC as the current master RM server, in at least some embodiments, has on average a more accurate view of the current mode of operation for the resource group, and it can respond more rapidly to a detected overshoot mode of operation for the resource group of the cluster.

Figure 7:
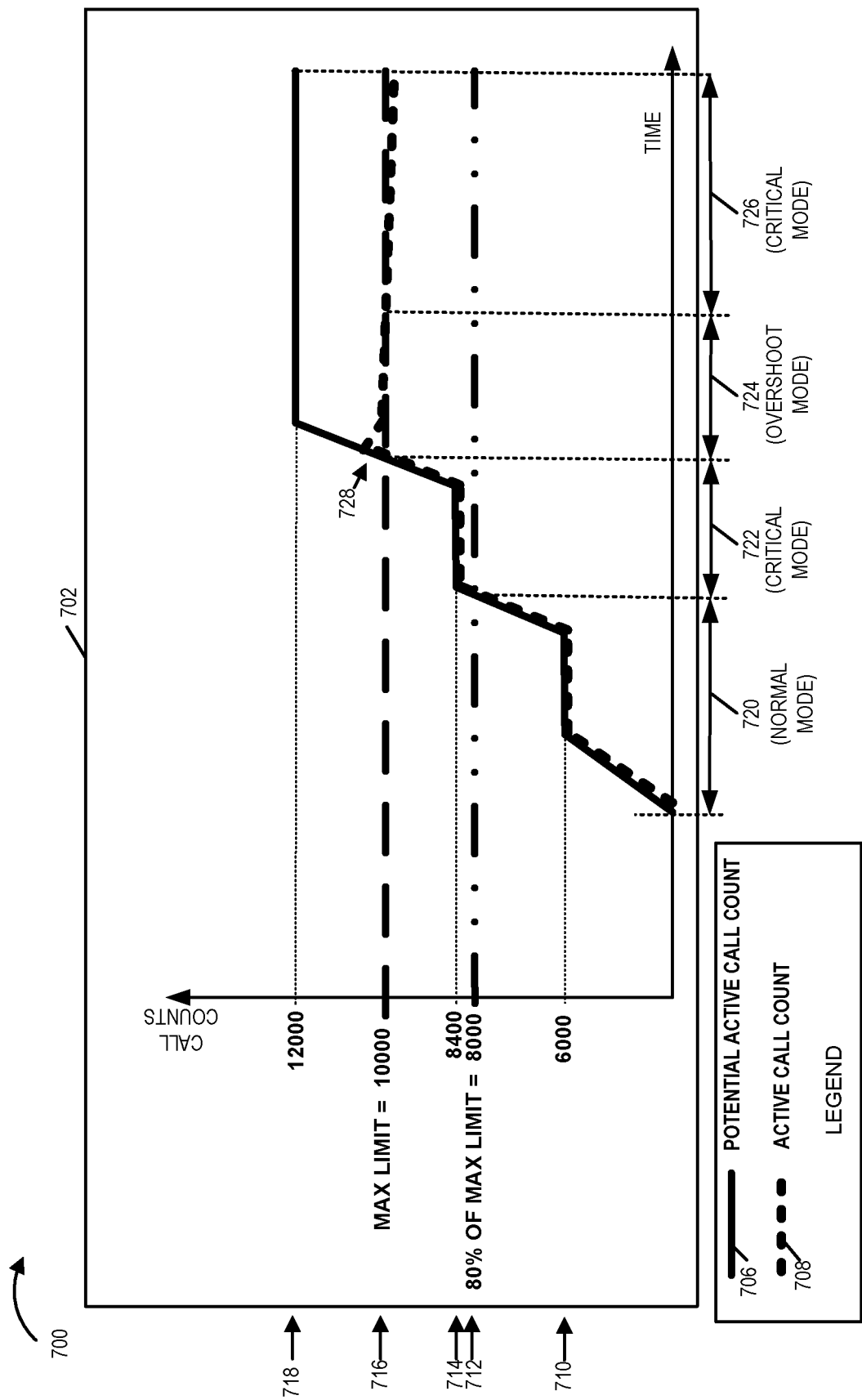
FIG. 7 is a plot of calls vs. time illustrating exemplary resource management of a call limit resource group for a cluster of SBCs, three exemplary modes of operation, exemplary mode determination criteria, an exemplary detected cluster resource usage overshoot condition, and the results of an allocation adjustment response using an overshoot factor in accordance with an exemplary embodiment.

FIG. 7 is a drawing 700 including a plot 702 of call count information vs. time and a legend 704. Legend 704 indicates that solid line 706 represents potential active call count and dashed line 708 represented active call count. Level 712 corresponds to the maximum call limit which is 10000. In some embodiments, the maximum call limit is considered a desired cluster target call limit for maximum utilization of the call limit resources corresponding to a trunk group for the cluster of SBCs. Level 712 corresponds to 80% of the maximum limit which is 8000. Level 710 is 6000. Level 714 is 8400. Level 718 is 12000.

In one embodiment, when the active call count is determined to be below level 712, the state is the normal state, when the active call count is determined to be between level 712 and level 716 the state is the critical state, and when the active call count is determined to be above level 716, the state is the overshoot state.

One can see that when traffic drastically increases, the actual active call count initially goes above max limit, but comes back, e.g., relatively quickly, to near 10000, which is the max limit. (See arrow 728.) Thus, the amount of overshoot is minimal and the recovery is relatively fast. During time interval 720 the cluster is in normal state; during time interval 722 the cluster is in critical state; during time interval 724 the cluster is in overshoot state; and during time interval 726, the cluster is in overshoot state.

When a new SBC node gets added to cluster, it will register to the current master Resource Management Server and as part of registration it will get an allocation based on free call limits divided by number of instances. FIG. 8 is an exemplary table 800 used to describe a cluster scale out scenario, e.g., cluster size increases, in which a new SBC node gets added to a cluster in accordance with an exemplary embodiment. The RM client module of new SBC node registers with the resource manager server which is currently serving as the master resource manager for the cluster. As part of the registration, the new SBC node gets a resource allocation from the master resource manager. The new SBC initially gets a resource allocation based on free resources divided by the number of SBC instances, e.g., the new SBC gets an allocated call limit based on the free call limits divided by the number of SBC instances. In the next interval, the new SBC node will report its actual resource usage, e.g., the new SBC reports active calls in the SBC node. In the next interval, the new SBC node will report actual usage (active calls) in the node.

First column 802 indicates SBC instance ID. Second column 804 indicates usage reported at Tn interval. Third column 806 indicates usage reported at Tn+1 interval. Fourth column 808 indicates total usage as of now. Fifth column 810 indicates allocated call limits. Third, fourth and fifth columns (806, 808, 810) form a set. Sixth column 812 indicates usage reported at Tn+2 interval. Seventh column 814 indicates total usage as of now. Eighth column 816 indicates allocated call limits. Sixth, seventh and eighth columns (812, 814, 816) form a set. Ninth column 818 indicates usage reported at Tn+3 interval. Tenth column 820 indicates total usage as of now. Eleventh column 822 indicates allocated call limits. Ninth, tenth and eleventh columns (818, 820, 822) form a set. Twelfth column 824 indicates usage reported at Tn+4 interval. Thirteenth column 826 indicates total usage as of now. Fourteenth column 828 indicates allocated call limits. Twelfth, thirteenth and fourteenth columns (824, 826, 828) form a set.

Row 830 shows information corresponding to SBC instance with ID1. Row 832 shows information corresponding to SBC instance with ID2. Row 834 shows information corresponding to SBC instance with ID3. Row 836 shows information corresponding to SBC instance with ID4. Row 838 shows information corresponding to SBC instance with ID5. Row 840 shows totals for various columns.

From the table 800 one can see that what happens when new SBC node (with ID=1) is getting added at time Tn+3. After registration, in the next message report, it may report a usage of 100. This first usage report by SBC with ID=1 is shown as the entry 100 in row 830 column 818 of table 800. The RM server operating as a master for the cluster of SBCs determines total usage as of now=7900 (row 830, column 820), since the previously determined total usage was 7800 (row 830, column 814) and reported usage of the new SBC with ID=1 is 100 (row 820, column 818). The master RM server determines the resource allocation for the SBC with ID=1 as an allocated call limit of 127 calls (row 830, column 822).

In particular for the SBC Instance with ID 1,

Allocation amount=(SBC reported usage/Total Cluster level usage)*Max resource limit Total Cluster level usage=7800+100=7900

Allocation amount=(100/7900)*10000=127

Thus the master resource Management Server allocates a call limit resource of 127 calls for SBC with ID=1. The other allocations for the other SBC nodes (ID=2, ID=3, ID=4) are adjusted accordingly, using the same allocation method resulting in resources allocations of (3396, 2000, 1429, 3131), respectively. In this example, it is shown that traffic is varying in each of the nodes, e.g., the reported usage for each of SBC nodes (ID=2, ID=3, ID=4), changes from the column 812 entry to the column 818 entry.

In various embodiments, this same solution will take care of both horizontal and vertical cloud scaling.

FIG. 9 is an exemplary table 900 used to describe a cluster scale-in scenario, e.g., SBC cluster size reduction, in which a SBC node in the cluster gets aborted or terminated in accordance with an exemplary embodiment. When an SBC instance get aborted/terminated, its usage amount will be subtracted by the master Resource Management Server in further calculations.

First column 902 indicates SBC instance ID. Second column 904 indicates usage reported at Tn interval. Third column 906 indicates usage reported at Tn+1 interval. Fourth column 908 indicates total usage as of now. Fifth column 910 indicates allocated call limits. Third column 906, fourth column 908 and fifth column 910 form a set. Sixth column 912 indicates usage reported at Tn+2 interval. Seventh column 914 indicates total usage as of now. Eighth column 916 indicates allocated call limits. Sixth column 912, seventh column 914 and eighth column 916 form a set. Ninth column 918 indicates usage reported at Tn+3 interval. Tenth column 920 indicates total usage as of now. Eleventh column 922 indicates allocated call limits. Ninth column 918, tenth column 920 and eleventh column 922 form a set. Twelfth column 924 indicates usage reported at Tn+4 interval. Thirteenth column 926 indicates total usage as of now. Fourteenth column 928 indicates allocated call limits. Twelfth column 924, thirteenth column 926, and fourteenth column 928 form a set.

Row 930 shows information corresponding to SBC instance with ID1. Row 932 shows information corresponding to SBC instance with ID2. Row 934 shows information corresponding to SBC instance with ID3. Row 936 shows information corresponding to SBC instance with ID4. Row 938 shows information corresponding to SBC instance with ID5. Row 940 shows totals for various columns.

From the table 900 one can see that what happens when SBC node (with ID=2) is getting terminated at time Tn+3. This is the time at which the master Resource Management Server came to know that the SBC node with ID=2 is down. For example, the master RM server detects that the SBC node with ID=2 has gone down from either a Transmission Control Protocol (TCP) connection failure or from no reports arriving from the SBC with ID=2 for a predetermined time interval, e.g., a long time. SBC with ID=2 has usage reported=0 (row 932, column 918); total usage as of now=8125−1100=7025 (row 932, column 920). The master RM server does not allocate any resources to SBC with ID=2, as indicated by the 0 entry (row 932, column 922).

So for each of the further Total usage calculations, the master Resource Management Server excludes usage corresponding to SBC with ID=2. Since suddenly SBC (ID=2)'s usage is removed, one can see the total allocation done for that Tn+3 interval is below 10000 (9805) (see entry column 922, row 940). But one can see that in next interval, Tn+4, it gets corrected and the total allocation is 10088 (see entry column 928, row 940), which is relatively close to the max limit of 10000.

Cluster CAC data re-built following a failure of the master resource management server will now be described. In various embodiments, if the currently elected master Resource Management Server goes down, a new Resource Management Server is elected to be the new master by a Leader Election mechanism. Following the election of the new master resource management server for the cluster, each of the SBC nodes will register to new Resource Management Server and will send their current usage, e.g., active call count, to new master Resource Management Server.

Until the new master Resource Management Server get resource utilization reports from each of the SBC nodes of the cluster, it has no concrete way to calculate the total resource usage of the cluster. To overcome this problem, in some embodiments, the SBC nodes will not apply global CAC for two intervals. This two interval time period is sometimes called the Sync-up period.

This means, any SBC node, once it finishes re-registration with the new Resource Management Server, is for the first two periods in the Sync-up period. During that period the SBC will not apply CAC using received call limits. In some embodiments the SBCs continue to apply global CAC using the allocation they received before the master Resource Management Server went down.

In some embodiments, rejected call information is utilized in the allocation determination. In one such embodiment, a session border controller, e.g., SBC client module, reports usage information including accepted call information and rejected call information, to the master resource controller server of the cluster. In one such embodiment the master Resource Management Server considers rejected calls information in the allocation mechanism in the following way.

Assume SBC Node with ID=1 reported Usage like this:

Accepted Call count=200

Rejected Call count=50

Total Requirement=200+50=250

If the TG level usage in the Cluster is <100%, the master Resource Management Server will consider 250 as reported usage amount.

If TG level usage >=100%, the master Resource Management Server will consider only Accepted call count as usage amount.

Major improvements or benefits of some embodiments of the present invention are described below. Methods and apparatus in accordance with some embodiment of the present invention bring CAC capability to Cloud environment without introducing any latency to call processing. Methods and apparatus in accordance with some embodiment of the present invention makes minimal intra cloud messages for CAC control messages. Methods and apparatus in accordance with some embodiment of the present invention work with random load with the same or nearly the same accuracy as it works with uniform load. Methods and apparatus in accordance with some embodiment of the present invention do not do any broadcasting for CAC. Methods and apparatus in accordance with some embodiment of the present invention do not increase intra Cloud CAC control messages when either load or TG numbers increases. (The control messaging increase is constant with T/2 sec reporting interval used for critical/overshoot modes as compared to the T sec reporting rate for normal mode.) Methods and apparatus in accordance with some embodiment of the present invention, facilitate resource allocation adjustment within two intervals, when the cluster scales in or scales out, e.g., providing a quick transition to the new loading levels. Methods and apparatus in accordance with some embodiment of the present invention use a method that does not take into consideration the number of cps per TG. Hence increasing or decreasing cps will not affect the performance.

Figure 10A:
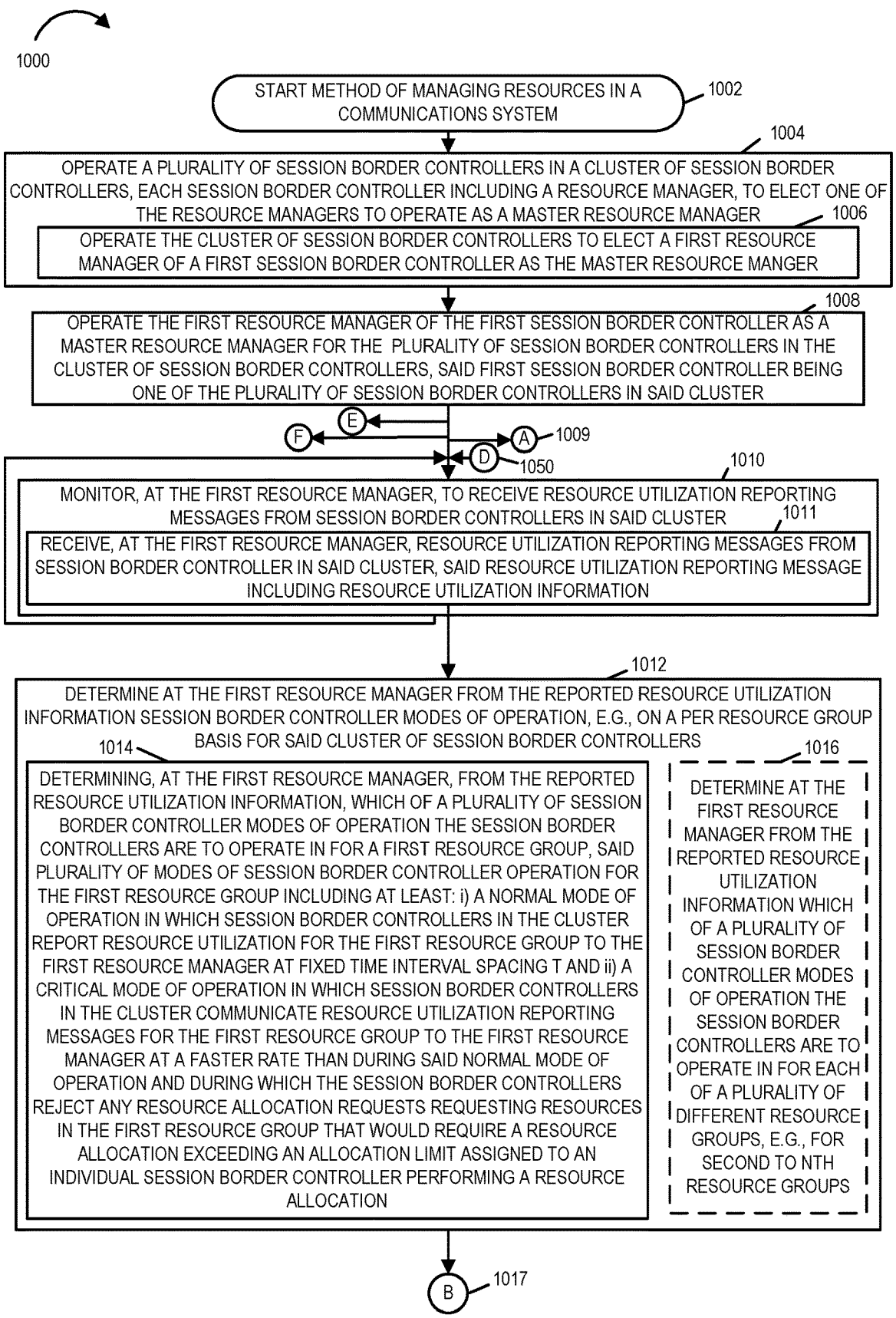
FIG. 10A is first part of a flowchart of an exemplary method of managing resources in a communications system in accordance with an exemplary embodiment.
Figure 10B:
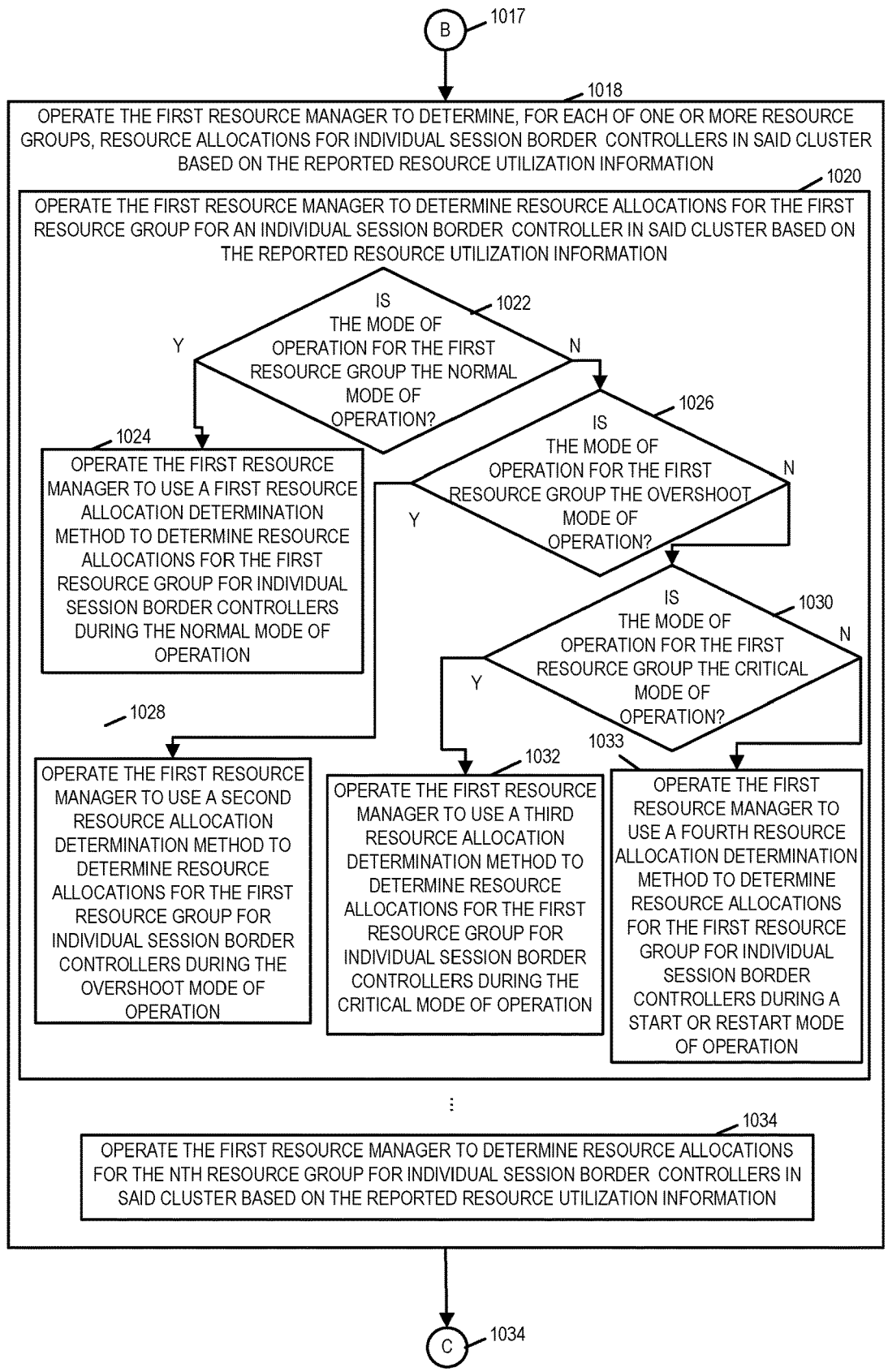
FIG. 10B is second part of a flowchart of an exemplary method of managing resources in a communications system in accordance with an exemplary embodiment.
Figure 10C:
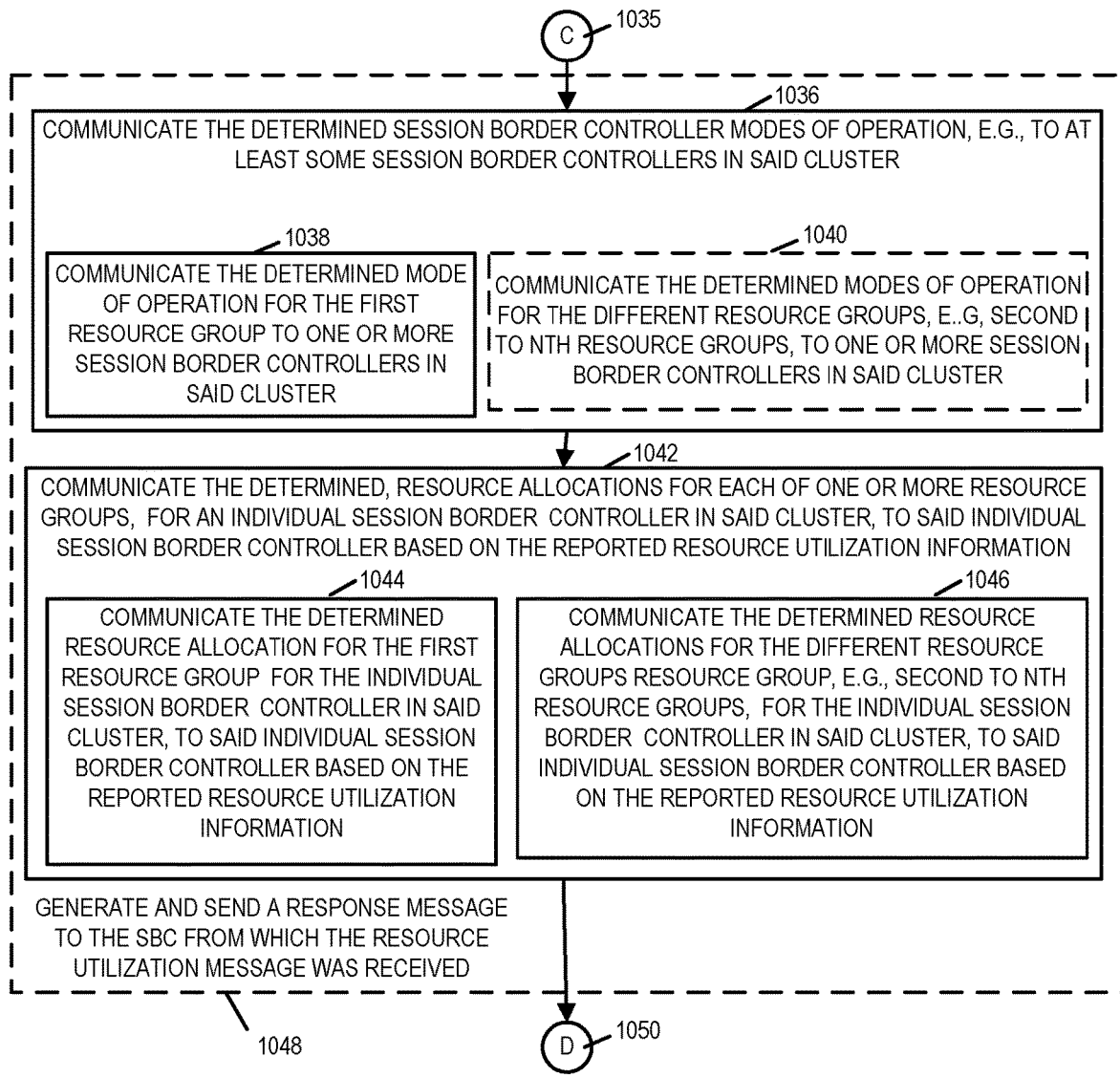
FIG. 10C is third part of a flowchart of an exemplary method of managing resources in a communications system in accordance with an exemplary embodiment.
Figure 10D:
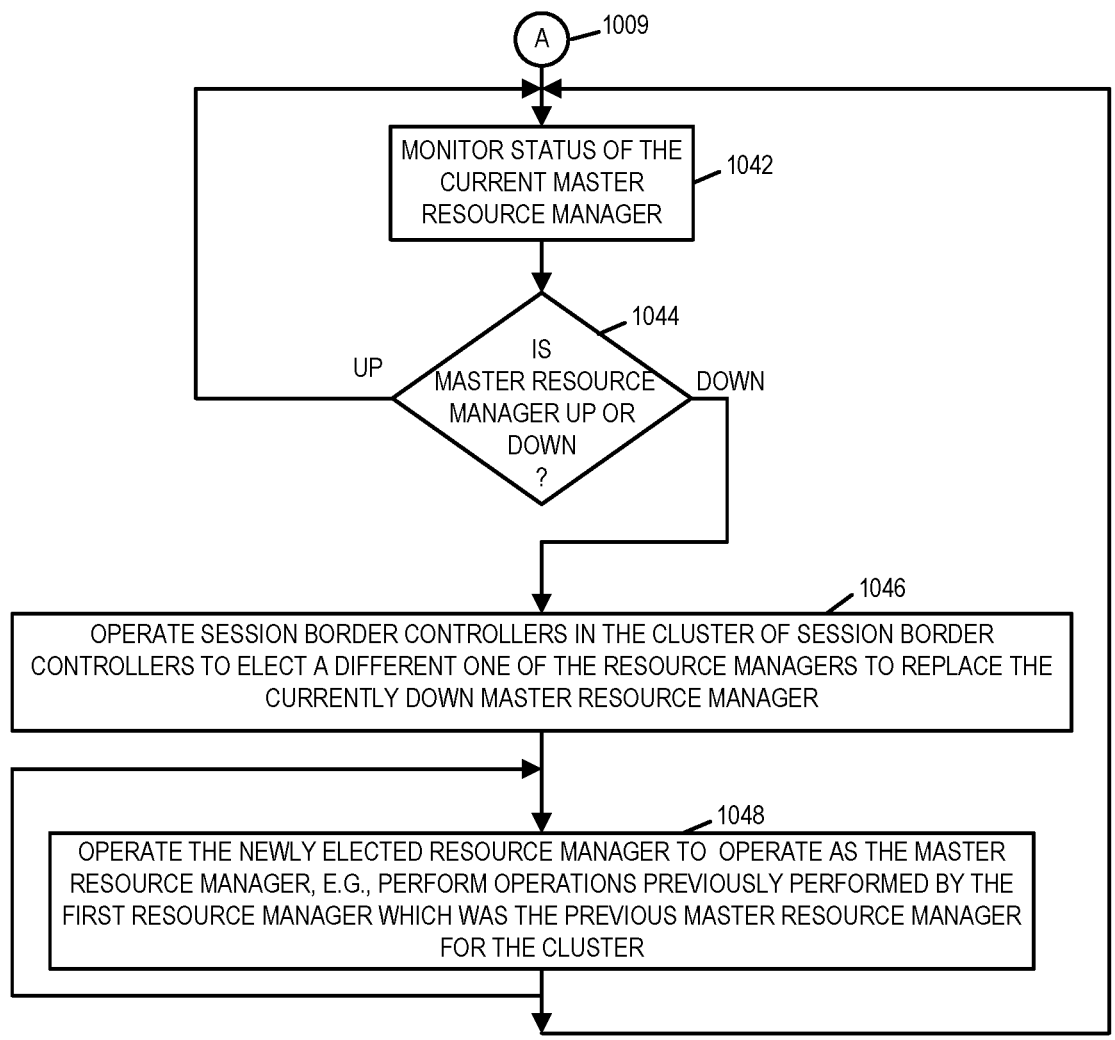
FIG. 10D is fourth part of a flowchart of an exemplary method of managing resources in a communications system in accordance with an exemplary embodiment.
Figures 10, 10E:
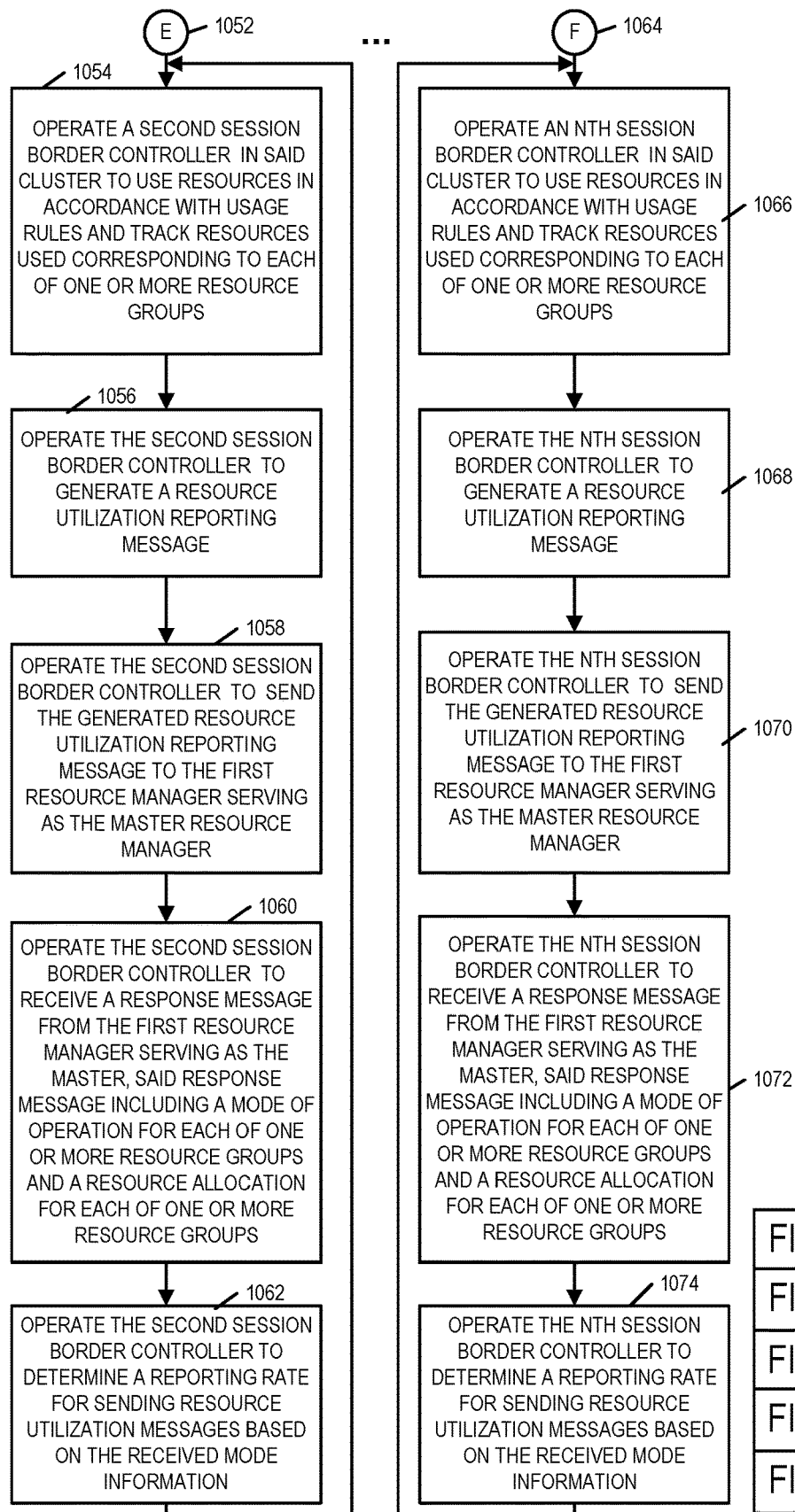
FIG. 10E is a fifth part of a flowchart of an exemplary method of managing resources in a communications system in accordance with an exemplary embodiment.
FIG. 10 comprises the combination of FIG. 10A, FIG. 10B, FIG. 10C, FIG. 10D and FIG. 10E.

FIG. 10, comprising the combination of FIG. 10A, FIG. 10B, FIG. 10C, FIG. 10D and FIG. 10E, is a flowchart 1000 of an exemplary method of managing resources in a communications system in accordance with an exemplary embodiment. Operation starts in step 1002 and proceeds to step 1004.

In step 1004 a plurality of session border controllers in a cluster of session border controllers, each session border controlling including a resource manager, are operated to elect one of the resource managers to operate as a master resource manager. Step 1004 includes step 1006 in which the cluster of session border controllers are operated to elect a first resource manager of a first session border controller as the master resource manager.

The features of clustering and determining a leader from among a group of SBCs will now be discussed in further detail. In an exemplary SIP load balancing embodiment, where the SBCs, e.g., SBCs 132, 134, 136, 138, and 140 are virtual instances in the cloud 102, the SBC instances within the cloud arrange themselves into one or more load balancing clusters (LBC) based on configuration. In this example, the SBC instances arrange themselves into a single cluster 118. The load balancing cluster contains one or more seed nodes (i.e., SBC instances), with these seed nodes (SBC instances) identified by a Fully Qualified Domain Name (FQDN) or IP addresses. The FQDN or IP addresses are part of the load balancing cluster configuration for the instance. In some embodiments, the specific nodes (SBCs) matching this FQDN are added by an Orchestrator or Virtual Network Function Manager (VNFM) while dynamically creating the SBC instances. Starting from these seed nodes, the SBC instances of a LBC dynamically elect one or more leaders. The election of the leader is determined using a bootstrap process starting from the seed nodes (SBCs). Bully resolution is used for resolving conflicts. The process is such that within a bounded time (dependent on the cluster size that is the number of SBCs in the cluster), all SBC instances of the load balancing cluster agree on the leader set. This leader set is tracked continuously. When any leader fails, a new election is invoked to select a replacement leader.

In some embodiments, each resource manager includes a RM server module and a RM client module. In some such embodiments, the RM server module of the elected resource manager, which is to serve as the master resource manager, becomes active while the RM server modules of the other resource managers are inactive. In various embodiments, the RM client modules of the SBCs in the cluster communicate with the active RM server module of the elected master resource manager.

In some embodiments, the session border controllers in said cluster are instances of session border controllers in a cloud based system. In some such embodiments, an operator sets a total resource allocation for each of one or more individual group resources that can be allocated, e.g., distributed, among the session border controllers. For example, an operator sets a total resource allocation for first group resources that can be allocated, e.g., distributed among the session border controllers; the operator sets a total resource allocation for second group resources that can be allocated, e.g., distributed among the session border controllers; and the operator sets a total resource allocation for Nth group resources that can be allocated, e.g., distributed among the session border controllers. In some embodiments, the master resource manager receives the total resource allocations settings for each of one or more individual resource groups that can be allocated. Operation proceeds from step 1004 to step 1008.

In step 1008 the first resource manager of the first session border controller is operated as the master resource manager for the plurality of session border controllers in the cluster of session border controllers, said first session border controller being one of the session border controllers in the cluster. Operation proceeds from step 1008 to step 1010. Operation also proceeds from step 1008 via connecting node A 1009, to step 1048. Operation also proceeds from step 1008, via connection node E 1052 to step 1064. Operation also proceeds from step 1008, via connecting node F 1064, to step 1066.

In step 1010 the first resource manager monitors to receive resource utilization reporting messages from session border controllers in said cluster. Step 1010 is performed on an ongoing basis. Step 1010 includes step 1011. In step 1011 the first resource manager receives a resource utilization reporting message from a session border controller in said cluster, said resource utilization reporting message include resource utilization information. Operation proceeds from step 1011 to step 1012 in response to the received resource utilization message.

In step 1012 the first resource manager determines from the reported resource utilization information session border controller modes of operation, e.g., on a per resource group basis, for said cluster of session border controllers. In various embodiments, in response to a received resource utilization reporting message from a session border controller including utilization information corresponding to a particular resource group, the first resource manager determines a session border controller mode of operation for the cluster for the particular resource group.

Step 1012 includes step 1014, and in some embodiments, includes step 1016. in step 1014 the first resource manager determines from the reported resource utilization information, which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in the cluster communicate resource utilization reporting messages for the first resource group to the first resource manager at a faster rate, e.g., a rate using interval spacing T/2, than during said normal mode of operation and during which the session border controllers reject any resource allocation requests requesting resources in the first resource group that would require a resource allocation exceeding an allocation limit assigned to an individual session border controller performing a resource allocation. In one embodiment, an individual session border controller rejecting any resource allocation request requesting resources in the first group that would exceed an allocation limit assigned to an individual session controller is rejecting any calls that would require resources that are more than have been allocated by the master/leader SBC, to the individual SBC.

In some embodiments, the plurality of session border controller modes of operation further includes an overshoot mode of operation wherein session border controller report resource utilization reporting messages to the first resource manager more frequently than during said normal mode of operation and wherein the session border controllers are controlled to reject resource allocation requests above the resource allocation assigned to the session border controller. In some such embodiments, the reporting rate during the critical mode of operation is the same as the reporting rate during the overshoot mode of operation. In some embodiments, during the normal mode of operation a session border controller can allocate resources above a resource allocation limit specified for the first resource group by the first resource manager for the individual session border controller performing the resource allocation. For example, in normal mode a client SBC can allocate more resources, e.g., use more resources, than the master SBC has allocated to the client SBC in a response message. For example, the client SBC can accept/process more calls than the number corresponding to the call limit allocation from the master SBC. In some embodiments, rejecting a resource allocation request includes denying a session initiation request, e.g., denying a call or video session initiation request.

In step 1016, the first resource manager determines from the reported resource utilization information which of a plurality of session border controller modes of operation the session border controllers are to operate in for each of a plurality of different resource groups, e.g., for the second to the Nth resource groups.

In some embodiments, at least one of the first resource group and said different resource groups is a bandwidth resource group and another resource group is a number of calls which can be admitted resource group. In some embodiments, the determined mode of operation for the first resource group is for a first trunk group. In some embodiments, at least one session border controller in the cluster supports multiple trunk groups, e.g., a first trunk group and a second trunk group. In one such embodiment, a first resource group is a bandwidth resource group corresponding the first trunk group, a second resource group is a number of calls which can be admitted group corresponding to the first trunk group, a third resource group is a bandwidth resource group corresponding to the second trunk group, and a fourth resource group is a number of calls which can be admitted corresponding to the second trunk group.

In some embodiments, the message reporting rate used during the critical and overshoot modes is at least twice the message reporting rate used during the normal mode of SBC operation, e.g., the reporting interval is T/2 or smaller for the critical and overshoot modes as compared to a reporting interval of T for the normal mode.

In some embodiments, the first resource manager determines from the reported resource utilization information a current total resource usage for the cluster for a resource group, and then determines, from the determined current total resource usage for the cluster for the resource group the mode of operation for the cluster for the resource group. For example, if current total resource usage is below or equal to a first resource limit, then the determined mode is normal mode; if the current total resource usage is above the first resource limit but below a second limit, then the determined mode is critical mode; and if the current total resource usage is equal to or above the second limit, then the determined mode is overshoot mode. In one embodiment, the first limit is 80% of the maximum resource limit and the second limit is 100% of the maximum resource limit. In one such embodiment, the maximum resource limit is 10000 calls, the first limit is 8000 calls, and the second limit is 10000 calls. In some embodiments, different resource groups corresponding to a cluster may, and sometimes do have different values for the first and/or second limits which are used for mode determination. For example, in one example, the first limit for a first resource group is 80% of the maximum resource limit and the second limit for the first resource group is 100% of the maximum resource limit, and the first limit for a second resource group is 75% of the maximum resource limit and the second limit for the first resource group is 100% of the maximum resource limit.

Operation proceeds from step 1012, via connecting node B 1017, to step 1018. Step 1018 includes step 1020 and step 1034.

In step 1018 the first resource manager is operated to determine, for each of one or more resource groups, resource allocations for the individual session border controllers in said cluster based on the reported resource utilization information. In various embodiments, a resource allocation for an individual session border controller of the cluster for each one or more resource groups is determined in response to a received resource utilization reporting message of step 1010 from the individual session border controller.

Step 1018 includes step 1020. In step 1020 the first resource manager is operated to determine resource allocations for the first resource group for individual session border controllers in said cluster based on the reported resource utilization information. Step 1020 includes steps 1022, 1024, 1026, 1028, 1030, 1032, and 1033.

In step 1022 if the determined mode of operation for the first resource is the normal mode of operation, then operation proceeds from step 1022 to step 1024; otherwise, operation proceeds from step 1022 to step 1026. In step 1024 the first resource manager is operated to use a first resource allocation determination method to determine resource allocations for the first resource group for individual session border controllers during the normal mode of operation.

In one exemplary embodiment, the first resource allocation determination method determines a resource allocation for an individual session border controller corresponding to a resource group based on the individual session border controller's reported usage corresponding to the resource group, a determined current total usage corresponding to the cluster for the resource group, and a maximum resource limit. For example, in one such embodiment, using the first allocation determination method, the allocation amount for an individual SBC for a resource group=(the individual SBC reported usage for the resource group/determined total cluster level usage)*maximum resource limit.

In step 1026, if the determined mode of operation for the first resource group is the overshoot mode of operation, then operation proceeds from step 1026 to step 1028; otherwise, operation proceeds from step 1026 to step 1030. In step 1028 the first resource manager is operated to use a second resource allocation determination method to determine resource allocations for the first resource group for individual session border controllers during the overshoot mode of operation.

In one exemplary embodiment, the second resource allocation determination method determines a resource allocation for an individual session border controller corresponding to a resource group based on the individual session border controller's reported usage corresponding to the resource group, a determined current total usage corresponding to the cluster for the resource group, an overshoot factor and a maximum resource limit. For example, in one such embodiment, using the second allocation determination method, the allocation amount for an individual SBC for a resource group=(the individual SBC reported usage for the resource group)−(Overshoot factor)*0.5*(the individual SBC reported usage for the resource group), where the overshoot factor=((determined total cluster level usage)−(maximum resource limit))/(maximum resource limit).

In various embodiments, both the first and second resource allocation determination methods, e.g., the allocation method used in normal state and the allocation method used in overshoot state, use information indicating the total first group resources being used by the cluster to determine resource allocation limits for individual session border controllers with respect to the first group resources in the cluster. In some embodiments, the second resource allocation determination method uses a factor, e.g., an overshoot factor, to result in lower resource allocation limits for session border controllers than are set for a given total resource utilization than when the first resource allocation determination method is used. Hence, this approach brings down the overshoot usage back to the maximum configured limit of the specific resource. Using this approach the reduction in allocation is not done abruptly but rather in a slower manner to avoid any under delivery. In some embodiments, the first and second resource allocation determination methods allocate more first group resources to a session border controller in said cluster reporting a first level of first resource group resource utilization than to another session border controller in said cluster reporting a second lower level of first resource group resource utilization. In some embodiments, with the first resource allocation method, e.g. the method used in normal mode, the master RM allocate a SBC, e.g., a SBC RM client module, more than it has requested, but in overshoot mode, the master RM will allocate a SBC, e.g., a client SBC module, either equal to or less the amount of resources than it has requested.

In step 1030, if the determined mode of operation for the first resource group is the critical mode of operation, then operation proceeds from step 1030 to step 1032. In step 1032 the first resource manager is operated to use a third resource allocation determination method to determine resource allocations for the first resource group for individual session border controllers during the critical mode of operation. In some embodiments, the third resource allocation determination method is the same as the first resource allocation determination method.

In step 1033, if the determined mode of operation for the first resource group is not critical mode of operation, then operation proceeds from step 1030 to step 1033. In step 1033 the first resource manager is operated to use a fourth resource allocation determination method to determine resource allocations for the first resource group for individual session border controllers during the a start or re-restart, e.g., reboot, mode of operation. In some embodiments, during the fourth allocation method includes providing an initial allocation to each of the SBC instances, e.g., based on the amount of free resources divided by the number of SBC instances. In some embodiments, the fourth allocation method includes refraining from allocating resource for a predetermined time, e.g., 2 T time intervals, and expecting the SBC to use the last set of resource allocations.

In step 1034 the first resource manager is operated to determine resource allocations for the Nth resource group for individual session border controllers in said cluster based on the reported resource utilization information.

In some embodiments, resources which are allocated are call admission resources and the messages reporting utilization include information indicating the number of active calls to which the resources were allocated by the session border controller sends the resource utilization reporting message to the first resource manager.

In some embodiments, each session border controller corresponds to one or more trunk groups and resource allocations are performed on a per trunk group and resource group basis. For example, there is one resource allocation for each of the different sets, e.g., groups of resources used and shared by a trunk group at an SBC, but and SBC can support multiple trunk groups which can and sometimes do have resources allocated separately.

Operation proceeds from step 1018, via connecting node C 1035, to step 1036. In step 1036 the determined session border controller modes of operation are communicated, e.g., to at least some session border controllers in said cluster. Step 1036 include step 1038, and in some embodiments, step 1040. In step 1038 the determined mode of operation for the first resource group is communicated to one or more session border controllers in said cluster. For example, the master/leader SBC indicates the state of the resource group, e.g., state of a call limit resource group corresponding to a trunk group, to an SBC, e.g., to an SBC client module, in a response message that the master/leader SBC sends to the client in response to a received resource utilization report from the client. The indicated state of the resource group in the response message, e.g., one of normal, critical or overshoot, determines the future frequency of resource utilization reports sent from the client SBC to the master/leader SBC.

In step 1040 the determined modes of operation for the different resource groups, e.g., second to Nth resource groups, are communicated to one or more session border controller in said cluster. For example, the master/leader SBC indicates the state of the resource group, e.g., state of a bandwidth resource group corresponding to a trunk group, to an SBC, e.g., to an SBC client module, in a response message that the master/leader SBC sends to the client in response to a received resource utilization report from the client. The indicated state of resource group in the response message, e.g., one of normal, critical or overshoot, determines the future frequency of resource utilization reports sent from the client SBC to the master/leader SBC.

In some embodiments, the determined modes of operation for the different resource groups are communicated to the one individual session border controller which sent the received resource utilization reporting message which is being responded to.

Operation proceeds from step 1036 to step 1042.

In step 1042 the determined allocations for each of one or more resource groups, for an individual session border controller in said cluster, are communicated to the individual session border controller in said cluster. Step 1042 includes step 1044, and in some embodiments, step 1046. In step 1044 the determined resource allocation for the first resource group for the individual session border controller is communicated to the individual session border controller in said cluster. In step 1046 the determined resource allocations for each the different resource groups, e.g., second to Nth resource groups, for the individual session border controller are communicated to the individual session border controller in said cluster.

In some embodiments, step 1036 and 1042 are included as part of step 1048, in which the first resource manager serving as the master resource manger generates and sends a response message to the SBC from which the resource utilization message of step 1011 was received.

In various embodiments, the first resource manager of the first session border controller receives, in step 1011 a resource utilization reporting message from an individual session border controller, determines, in step 1012, a mode of operation for the cluster for each of one or more resource groups, determines, in step 1018 a resource allocation for each of one of more resource groups for the individual SBC which sent the resource utilization reporting message, and communicates, in steps 1036 and 1042, the determined modes of operation and resource allocations to the individual SBC. In some such embodiments, the first resource manager generates and sends a response message, in step 1048, in response to the received resource utilization message of step 1011, said the sent response message to the individual SBC communicates both: (i) the determined SBC modes of operation for the cluster, e.g., performing step 1036, and (ii) the determined resource allocations for the one or more resource groups for the individual SBC of the cluster, e.g., performing step 1042.

Operation proceeds from step 1042 via connecting node D 1050 to step 1010.

In step 1048 the status of the current master resource manager is monitored. Operation proceeds from step 1048 to step 1050. If the monitoring determined that the master resource manager is up, then operation proceeds from step 1048 to step 1050 to continue checking the status. However, if the monitoring indicates that the master resource manager is down, then operation proceeds from step 1050 to step 1052.

In step 1052 the session border controllers in the cluster of session border controllers are operated to elect a different one of the resource managers to replace the currently down master resource manager. Operation proceeds from step 1052 to step 1054, in which the newly elected resource manager is operated as the master resource manage for the cluster of session border controllers, e.g., is operated to perform operation previously performed by the first resource manager which was the previous master resource manager for the cluster. Operation proceeds from step 1054 to step 1048, in which the status of the current master resource manager is monitored.

In step 1054, a second session border controller in said cluster of session border controllers is operated to use resources in accordance with resource usage rules and to track resources used corresponding to each of one or more resource groups. In some embodiments, the resource usage rules are such that in normal mode the SBC is allowed to use X %, e.g., 5%, more resources than allocated, while in overshoot mode the SBC is allowed to use at most the allocated level of resources. Operation proceeds from step 1054 to step 1056. In step 1056, the second session border controller generates a resource utilization reporting message including amounts of used resources corresponding to one or more resource groups. Operation proceeds from step 1056 to step 1058. In step 1058 the second session border controller sends the generated resource utilization reporting message to the first resource manager serving as the current master resource manager for the cluster. Operation proceeds from step 1058 to step 1060. In step 1060 the second session border controller receives a response message from the first resource manager serving as the master resource manager, said response message including a mode of operation for each of one or more resource groups and a resource allocation for each of one or more resource groups. Operation proceeds from step 1060 to step 1062. In step 1062 the second session border controller determines a reporting rate for sending resource utilization reporting messages based on the received mode of operation information. The determined reporting rate is used to control when the next reporting message is sent, e.g., the next iteration of step 1058. In one exemplary embodiment, in normal mode the reporting rate uses a T sec interval, and the reporting rate during critical mode and overshoot mode uses a T/2 sec interval. In some such embodiments, T is a predetermined value in the range 10 sec≤T≤30 sec. In some embodiments, if different resource groups are in different modes corresponding to different rates, the determined reporting rate is the highest rate, e.g., smallest reporting time interval, among the alternative rates. Operation proceeds from step 1062 to step 1054.

In step 1066, a Nth session border controller in said cluster of session border controllers is operated to use resources in accordance with resource usage rules and to track resources used corresponding to each of one or more resource groups. In some embodiments, the resource usage rules are such that in normal mode the SBC is allowed to use X % more resources than allocated, while in critical or overshoot mode the SBC is allowed to use at most the allocated level of resources. Operation proceeds from step 1066 to step 1068. In step 1068, the Nth session border controller generates a resource utilization reporting message including amounts of used resources corresponding to one or more resource groups. Operation proceeds from step 1068 to step 1070. In step 1070 the Nth session border controller sends the generated resource utilization reporting message to the first resource manager serving as the current master resource manager for the cluster. Operation proceeds from step 1070 to step 1072. In step 1072 the Nth session border controller receives a response message from the first resource manager serving as the master resource manager, said response message including a mode of operation for each of one or more resource groups and a resource allocation for each of one or more resource groups. Operation proceeds from step 1072 to step 1074. In step 1074 the Nth session border controller determines a reporting rate for sending resource utilization reporting messages based on the received mode of operation information. The determined reporting rate is used to control when the next reporting message is sent, e.g., the next iteration of step 1070. In one exemplary embodiment, in normal mode the reporting rate uses a T sec interval, and the reporting rate during critical mode and overshoot mode uses a T/2 sec interval. In some such embodiments, T is a predetermined value in the range 10 sec≤T≤30 sec. In some embodiments, if different resource groups are in different modes corresponding to different rates, the determined reporting rate is the highest rate, e.g., smallest reporting time interval, among the alternative rates. Operation proceeds from step 1074 to step 1068.

Steps have been shown for the second and Nth session border controller, e.g., RM client module operational steps. It should be appreciated that the 3rd to N−1 th session border controllers in the cluster may also operate in a similar manner. In addition, it should be appreciated that the RM client module of the first resource manager may also be active, e.g., with the RM server module, which is the master, controlling the RM client module of the first resource manager. In such a case, resource utilization reporting messages and response messages are communicated internally with the first SBC.

In various embodiments, the resource utilization reporting messages send by the different SBCs of the cluster are asynchronous. In various embodiments, mode changes at different SBCs in the cluster may, and sometimes do occur at different points in time, e.g., in response to a received response message, e.g. a unicast message, directed to the individual SBC, said response message being in response to a reporting message from the individual SBC. In various embodiments, a mode for a resource group corresponding to a cluster of SBCs is not sent in a broadcast message to the cluster.

Figure 11:
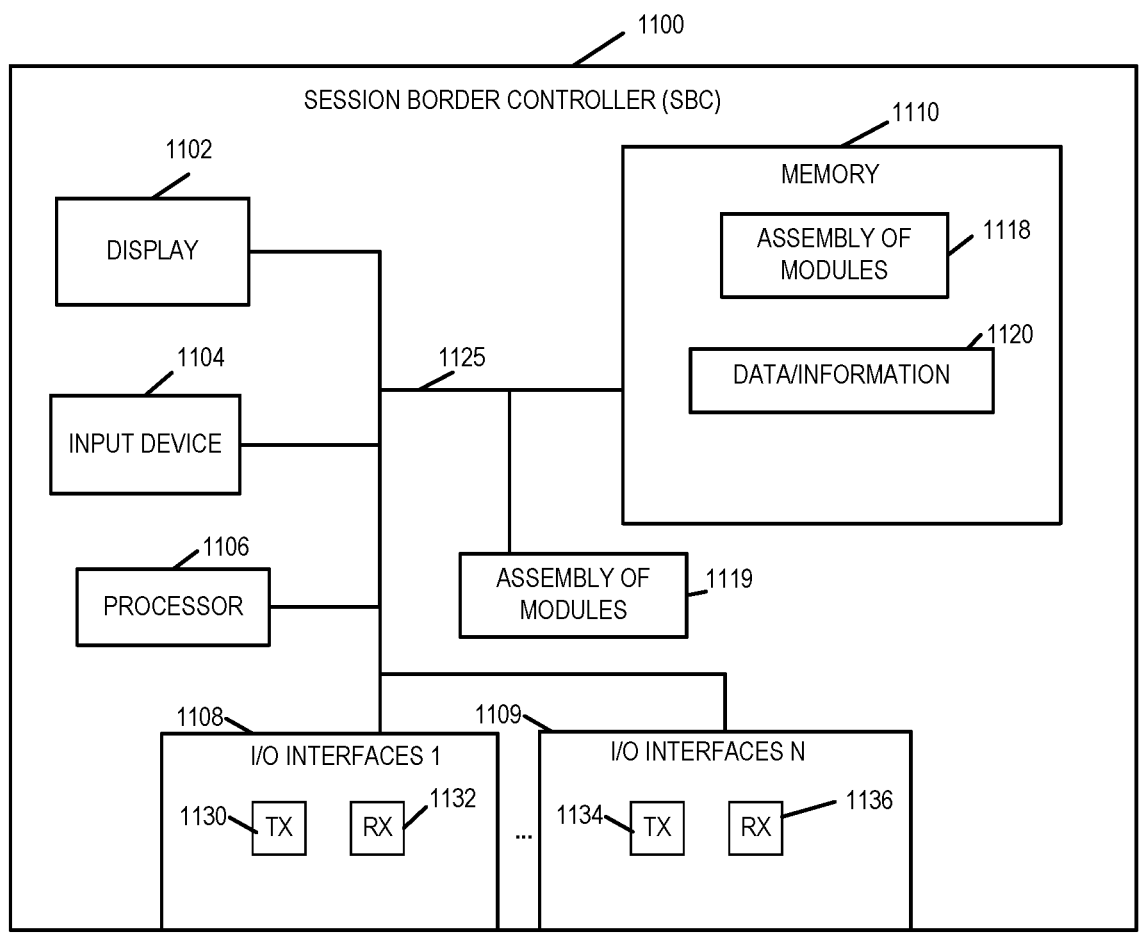
FIG. 11 is a drawing of an exemplary session border controller (SBC) in accordance with an exemplary embodiment.

FIG. 11 is a drawing of an exemplary session border controller (SBC) 1100 in accordance with an exemplary embodiment. Session border controller 1100, is, e.g., one of the SBCs (SBC 1 132, SBC 2 134, SBC 3 136, SBC 4 180, . . . , SBC n 140) of FIG. 1, (one of the SBCs (SBC 1 202, SBC 2 204, SBC 3 206, SBC 4 208, . . . , SBC n 210) of FIG. 2, SBC X 402 of FIG. 4, SBC Y 404 of FIG. 4, an SBC implementing one or more steps of the method of FIG. 10, or an SBC implementing steps of a method described with respect to any of Figures. Exemplary session border controller 1110 includes a display 1102, an input device 1104, a processor 1106, e.g., a CPU, a plurality of I/O interfaces (I/O interfaces 1 1108, . . . , I/O interfaces N 1109), and an assembly of modules 1119, e.g., an assembly of hardware modules, e.g., assembly of circuits, coupled together via a bus 1125 over which the various elements may exchange data and information. Memory 1110 includes an assembly of modules 1118, e.g., an assembly of software modules, e.g., routines, and data/information 1120. Each of the I/O interfaces (I/O interfaces 1 108, . . . , I/O interfaces N 1109) includes one or more transmitters and one or more receivers ((transmitter 1130, receiver 1132), . . . , (transmitter 1134, receiver 1136)), respectively, for transmitting and receiving signals, respectively. Transmitted and received signals include, e.g., resource utilization reporting messages and corresponding response messages. Display device 1102, e.g., a display screen, can display data/information, e.g., resource utilization information, e.g., tables and/or plots, status information, e.g. mode of operation of a cluster, information identifying the current master resource manager in the cluster, information indicating number of SBC instances in the cluster, etc. Input device 1106, e.g., keypad, keyboard, etc., can receive user input, e.g., operator input setting a total resource allocation for a first resource group that can be allocated, e.g., distributed, among the cluster of session border controllers.

Figure 12:
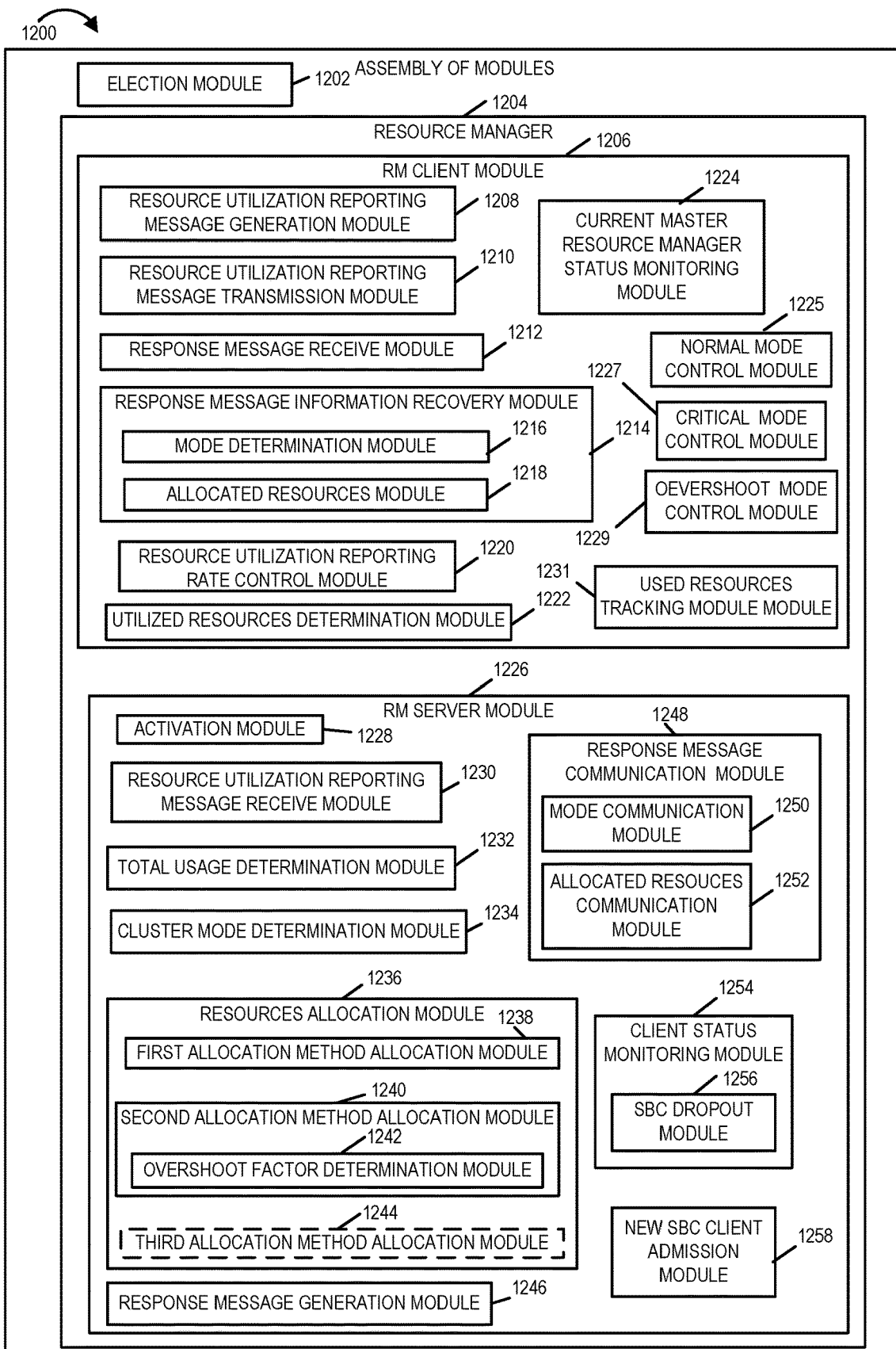
FIG. 12 is a drawing of an assembly of modules, which may be included in the SBC of FIG. 11, in accordance with an exemplary embodiment.

FIG. 12 is a drawing of an assembly of modules 1200 in accordance with an exemplary embodiment. Assembly of modules 1200 which may be included in an exemplary session border controller, e.g., SBC 1100 of FIG. 11, in accordance with an exemplary embodiment. The modules in the assembly of modules 1200 can, and in some embodiments are, implemented fully in hardware within the processor 1106, e.g., as individual circuits. The modules in the assembly of modules 1200 can, and in some embodiments are, implemented fully in hardware within the assembly of modules 1119, e.g., as individual circuits corresponding to the different modules. In other embodiments some of the modules are implemented, e.g., as circuits, within the processor 1106 with other modules being implemented, e.g., as circuits within assembly of modules 1119, external to and coupled to the processor 1106. As should be appreciated the level of integration of modules on the processor and/or with some modules being external to the processor may be one of design choice. Alternatively, rather than being implemented as circuits, all or some of the modules may be implemented in software and stored in the memory 1110 of the session border controller 1100, with the modules controlling operation of the session border controller 1100 to implement the functions corresponding to the modules when the modules are executed by a processor, e.g., processor 1106. In some such embodiments, the assembly of modules 1200 is included in the memory 1110 as assembly of modules 1118. In still other embodiments, various modules in assembly of modules 1200 are implemented as a combination of hardware and software, e.g., with another circuit external to the processor providing input to the processor 1106 which then under software control operates to perform a portion of a module's function. While shown in the FIG. 11 embodiment as a single processor, e.g., computer, it should be appreciated that the processor 1106 may be implemented as one or more processors, e.g., computers.

When implemented in software the modules include code, which when executed by the processor 1106, configure the processor 1106 to implement the function corresponding to the module. In embodiments where the assembly of modules 1200 is stored in the memory 1110, the memory 804 is a computer program product comprising a computer readable medium comprising code, e.g., individual code for each module, for causing at least one computer, e.g., processor 1106, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 12 control and/or configure the session border controller 1100 or elements therein such as the processor 1106, to perform the functions of corresponding steps illustrated in the method of the flowchart of FIG. 10 and/or shown or described with respect to any of the FIGS. 1-13. Thus the assembly of modules 1200 includes various modules that perform functions of corresponding steps of one or more of FIG. 10.

Assembly of modules 1200 includes an election module 1202 and a resource manager 1204. Election module 1202 is configured to operate the session border controller to participate in electing one of the resource managers in a cluster of session border controllers including the session border controller as the master resource manager for the cluster of session border controllers. For example, the election module 1202 participates in electing a first resource manager of a first session border controller as the master. Election module 1202 is further configured to operate the session border controller to participate in electing a different one of the resource managers to replace a currently down master resource manager, e.g., elect a new master resource manager for the cluster of SBCs in response to a detection that a current master resource manager is down.

Resource manager 1204 includes a resource manager (RM) client module 1206 and a RM server module 1226. RM client module 1206 includes a resource utilization reporting message generation module 1208, a resource utilization reporting message transmission module 1210, a response message receive module 1212, a response message information recovery module 1214, a resource utilization reporting rate control module 1220, a utilized resource determination module 1222, a current master resource manager status monitoring module 1224, a normal mode control module 1225, a critical mode control module 1227, an overshoot mode control module 1228, and a used resource tracking module 1229. Response message information recovery module 1214 includes a mode determination module 1216 and an allocated resources determination module 1218.

Resource utilization reporting message generation module 1208 is configured to generate a resource utilization reporting message including resource utilization information corresponding to one or more resource groups, e.g., reporting an amount of used resources corresponding to each of one or more resource groups corresponding to a reporting time interval. Resource utilization reporting message transmission module 1210 is configured to send a generated resource utilization reporting message to the current master resource manager for the cluster of SBCs, e.g. to the first resource manager of the first SBC currently serving as the master resource manager for the cluster.

Response message receive module 1212 is configured to receive a response message from the current master resource manager, e.g., the first resource manager, in response to a previously transmitted resource utilization reporting message. In some embodiments, the received response message includes a mode of operation, e.g., one of normal mode, critical mode, and overshoot mode, and a resource allocation, e.g., a resource allocation for the SBC, corresponding to each of one or more resource groups. Response message information recover module 1214 recovers the information communicated in the received response message. Mode determination module 1212 determines a current mode of operation, e.g., normal, critical or overshoot mode, for the session border controller for each of one or more resource groups, based on mode information communicated in the response message. Allocated resource module 1218 recovers information indicating an amount of allocated resources for the SBC for each of one or more resource groups. Resource utilization reporting rate control module 1220 controls the rate of sending resource utilization reporting messages to the master resource manager, e.g., the first resource manager, as a function of the mode of operation of the session border controller. In various embodiments, the message reporting rate during normal mode is lower than the message reporting rate during critical mode and during overshoot mode. In some embodiments, the message reporting rate during critical mode and overshoot mode is at least twice the message reporting rate during normal mode. For example, in one embodiment in normal mode resource utilization reporting messages are send at T sec intervals, and during critical and overshoot mode the resource utilization reporting messages are sent at T/2 sec intervals. FIG. 4 illustrates this exemplary embodiment. In one exemplary embodiment T=10 seconds. In some embodiments, three different reporting rates are used, with the rate for overshoot mode being higher than the rate for critical mode, and the rate for overshoot mode being higher than the rate for critical mode.

Utilized resources determination module 1222 determines an amount of resource used by the SBC for each of one of more resource groups, e.g., since the last reporting message was sent. Used resource amounts determined by module 1222 are included in a resource utilization reporting message.

Current master resource manager status monitoring module 1224 is configured to monitor the status of the current master resource manager, e.g., up or down, and to notify the election module 1202 of a detected down status, e.g., setting off a new election for a replacement master resource manager.

Normal mode control module 1225 is configured to control the SBC to operate in normal mode for a resource group, in response to module 1216 determining that the mode is normal mode. Normal mode control module 1225 controls the SBC to report resource utilization messages at a first rate, e.g., a T sec reporting rate, and to use resources for a resource groups at a level above the allocated amount of resources, e.g. X % above the allocated limit. In one embodiment X=5. In another embodiment X=10. In some embodiments, different resource groups may, and sometimes do have different values for X.

Critical mode control module 1227 is configured to control the SBC to operate in critical mode for a resource group, in response to module 1216 determining that the mode is normal mode. Critical mode control module 1227 controls the SBC to report resource utilization messages at a second rate, e.g., a T/2 sec reporting rate, and to refrain from using resources about the allocated limit, e.g. reject anything above the allocated limit. Overshoot mode control module 1229 controls the SBC to report resource utilization messages at a third rate and to refrain from using resources about the allocated limit, e.g. reject anything above the allocated limit. In some embodiments, the third rate is the same as the second rate, e.g., T/2.

Used resource tracking module 1229 is configured to track, e.g. count, used resources for a reporting interval time period, e.g., since the last resource utilization report, e.g. on a per resource group basis. In normal mode the amount of used resource corresponding to the resource groups may exceed the allocated resources, e.g., by up to a predetermined X %; however, in critical or overshoot mode the amount of used resources is at most the value of the allocated resources.

RM server module 1226 includes an activation module 1228, a resource utilization reporting message receive module 1230, a total usage determination module 1232, a cluster mode determination module 1234, a resources allocation module 1236, a response message generation module 1246, a response message communication module 1248, a client status monitoring module 1254, and a new SBC client admission module 1258. Resources allocation module 1236 includes a first allocation method allocation module 1238, a second allocation method module 1240, and in some embodiments, a third allocation method allocation module 1244. Second allocation method allocation module 1240 includes an overshoot factor determination module 1242.

Activation module 1128 controls the RM server module 1226 to become activated and to start operating as the master resource manger for a cluster of session border controllers, e.g., in response to a received signal from election module 1202 indicating that the resource manager 1204 has been elected to serve as the master resource manger for the cluster of SBCs.

Resource utilization reporting message receive module 1230 is configured to receive resource utilization reporting messages sent from SBCs, in the cluster, e.g. reporting resource utilization information, e.g. amounts of used resources, e.g., number of calls, amounts of bandwidth used, etc., corresponding to one or more resource groups.

Total usage determination module 1232 determines a total amount of resources used by the cluster corresponding to each of one or more resource groups based on the reported utilization information from the received resource utilization messages. Entries in columns 308 and 314 of FIG. 3, columns 608 and 610 of FIG. 6, columns 808, 814, 820, 826 of FIG. 8, columns 908, 914, 920 and 926 illustrate examples if total usage determinations by module 1232.

Cluster mode determination module 1234 determines from the reported resource utilization information session border controller modes of operation, e.g., on a per resource group basis for the cluster of session border controllers. A determined mode of operation is, e.g., one of normal mode, critical mode or overshoot mode. In some embodiments, module 1234 is configured to determine from the reported resource utilization information which of a plurality of session border controller modes of operation the session border controllers are to operate in for a first resource group including at least; i) a normal mode of operation in which the session border controllers in the cluster report utilization for the first resource groups to the master resource manger at fixed interval time spacing T, and ii) a critical mode of operation in which the session border controllers in the cluster communicate resource utilization reporting messages for the cluster for the first resource groups to the master resource manger at a rate faster than during the normal mode of operation and during which the session border controllers reject any allocation requests requesting resources in the first resource group that would require a resource allocation exceeding an allocation limit assigned to an individual session border controller performing a resource allocation. In some such embodiments, the modes further include an overshoot mode of operation in which the session border controllers in the cluster communicate resource utilization reporting messages for the cluster for the first resource groups to the master resource manger at a rate faster than during the normal mode of operation and during which the session border controllers reject any allocation requests requesting resources in the first resource group that would require a resource allocation exceeding an allocation limit assigned to an individual session border controller performing a resource allocation. In some such embodiments, the rate during critical mode is the same as the rate during overshoot mode, e.g. a T/2 sec reporting interval. In one exemplary embodiment, the determined mode is normal mode if the total resources used by the cluster for the resource group is less than or equal to first cluster usage limit, e.g. 80% of a maximum resource limit; the determined mode is critical mode if the total resources used by the cluster for the resource group is greater than the first cluster usage limit but less or equal to than the maximum resource limit; and the determined mode is overshoot mode if the total resources used by the cluster for the resource group is greater than the maximum resource limit.

Resource allocation module 1236 is configured to allocate resources to an SBC for a resource group, e.g. in response to a received resource utilization message, based on the reported resource utilization information and a determined mode of operation for the cluster and resource group. Resource allocation module 1236 determines for each of one or more resource groups, a resource allocation for an individual session border controller in said cluster based on the reported resource utilization information. Resource allocation module 1236 determines resource allocations for a first resource group for an individual session border controller in said cluster based on the reported resource utilization information. First allocation method allocation module 1239 uses a first resource allocation method to determine resource allocations for a resource group, e.g., a first resource group, for individual session border controllers during the normal mode of operation. Entries of columns 310 and 316 of FIG. 3 illustrate examples of an exemplary first resource allocation method corresponding to a normal mode of operation. Second allocation method allocation module 1240 uses a second resource allocation determination method to determine resource allocations for a resource group, e.g. the first resource group, for individual session border controllers during the overshoot mode of operation. Overshoot factor determination module 1242 determines an overshoot factor based on reported usage information. In one embodiment, the second allocation method uses the following formula to determine an allocation amount for an SBC in the cluster corresponding to a resource group when in overshoot mode. Allocation amount for the SBC=Reported usage by the SBC−((overshoot factor)*(0.5)*(Reported Usage by the SBC), where Overshoot factor=(Total cluster level usage− max limit)/Max Limit. Exemplary calculations for the overshoot factor and an allocation amount when in overshoot mode are included in FIG. 6, e.g., the example corresponding to row 620 and columns 606, 608, 612. Third allocation method allocation module 1244 is included in some embodiments, in which a different allocation method is used during the critical mode of operation. In some embodiment, the same allocation method used during the normal mode of operation is used during the critical mode of operation.

Response message generation module 1246 is configured to generate a response message, e.g. in response to a received resource utilization reporting message. In some embodiments, a single response message includes both mode of operation information, e.g., a determined mode of operation corresponding to each of one or more resource groups, and resource allocation information, e.g., a resource allocation for each of one or more resource groups. In some other embodiments, a first response message communicates one or more determined modes of operation corresponding to one or more resource groups, and a second response message communicates one or more resource allocations corresponding to one or more resource groups.

Response message communication module 1248 includes a mode communication module 1250 and an allocated resources communications module 1252. Response message communication module 1248 sends one or more generated response messages from module 1246 to an SBC in response to a received resource utilization reporting message. Mode communication module 1250 communicates the determined session border controller modes of operation, e.g., corresponding to one or more resource groups to at least one session border controller in the cluster, e.g., the particular SBC in the cluster which previously sent the resource utilization reporting message which is being responded to at this time. Allocated resource communication module 1252 communicates the determined resource allocation for each of one or more resource groups for an individual session border controller in the cluster to said individual session border controller.

Client status monitoring module 1254 monitor status of SBC which are registered and which are currently being controlled by the RM server module 1226, which is a master for the cluster. Client status monitoring module 1254 includes a session border controller dropout module 1256. SBC dropout module 1256 detects that a client SBC has dropped out, e.g., the cluster has scaled down, and responds to the detected decreases in the number of SBC instances, e.g., reallocating resources in response to the detected dropped out SBC. FIG. 9 illustrates an example in which SBC instance with ID=2 drops out and the allocation to the remaining SBCs are controlled to increase.

New SBC client admission module 1258 is configured to respond to a detected newly registered SBC client, e.g., allocating initial resources to the new client SBC, e.g. based on available free resources and the number of active SBC clients in the cluster, and subsequently allocating resources to the new client in accordance with the methods based on reported resource usage, total determined cluster usage, and determined mode. FIG. 8 illustrates an example in which a new client SBC, e.g., SBC with ID=1, is added into the cluster.

FIG. 13 is a drawing of exemplary information table 1300 corresponding to a currently elected master RM server for a cluster of SBCs, in accordance with an exemplary embodiment. First column 1302 lists exemplary cluster modes of operation (normal, critical and overshoot) for a resource group corresponding to the cluster of SBC with is being managed by the master. Second column 1304 lists exemplary mode determination criteria used by the master to determine a current mode of operation corresponding to the resource group for the cluster. Third column 1306 lists exemplary resource allocation methods used corresponding to each of the modes. When the master RM server determines that the total reported resource utilization for resource group for the cluster is <80% of a maximum resource limit, the master RM server determines that the mode is normal mode and the first allocation method is used by the master to determine a resource allocation for a client SBC. When the master RM server determines that the total reported resource utilization for the resource group for the cluster is ≥80% of a maximum resource limit and ≤100 of the maximum resource limit, the master RM server determines that the mode is critical mode and the first allocation method is used by the master to determine a resource allocation for a client SBC. When the master RM server determines that the total reported resource utilization for resource group for the cluster is >100% of a maximum resource limit, the master RM server determines that the mode is overshoot mode and a second allocation method is used by the master to determine a resource allocation for a client SBC, the second allocation method being different from the first allocation method and the second allocation method including the use of an overshoot factor which is used to reduce allocations and bring down, e.g., gradually bring down, the overshoot condition.

In one exemplary embodiment, the maximum resource limit is 10000 calls. An exemplary first allocation method is described with the allocated call limit calculations for FIG. 3. An exemplary second allocation method using an overshoot factor is described with respect to some of the allocated call limits calculations of FIG. 6, e.g., the allocation corresponding to row 620, column 610.

In some exemplary embodiments, slightly different limits are used to determine transitions between two modes, e.g., for a hysteresis effect. For example, the limit for the transition from critical to overshoot is 10000 and the limit for the transition from overshoot to critical is 9980.

FIG. 14 is a drawing of exemplary information table 1400 corresponding to an RM client module of an SBC in a cluster of SBCs, in accordance with an exemplary embodiment. First column 1402 lists exemplary cluster modes of operation (normal, critical and overshoot) for a resource group corresponding to the cluster of SBC with is being managed by the master. The client module receives information indicating the cluster mode of operation for the resource group from a response message from the master RM server module. Second column 1404 lists the resource utilization reporting rate interval used by the SBC client to report resource utilization information corresponding to the resource group based on the mode. In this exemplary embodiment, in normal mode, the reporting rate is T sec, while in critical and overshoot mode, the reporting rate is T/2 sec. In some embodiments T is a predetermined value in the range of 0.5 to 35. Third column 1406 lists the amount of resources that may be used by the client. In the exemplary embodiment, in normal mode the client may use the amount of resource allocated by the master RM server to the client, e.g., which have been previously communicated in a response message, plus an additional X % additional amount of resources. In one embodiment, X is a predetermined value in the range of 2.5 to 15. In one embodiment, X=5. In the exemplary embodiment, in critical and overshoot modes, the client is allowed to use at most the amount of resource group resources allocated to the client, e.g., which have previously been communicated to the client in a response message. For example, in critical and overshoot modes the client SBC can accept calls only up to the allocation amount received from the master SBC.

In another exemplary embodiment, in normal and critical modes, the client may use the amount of resource allocated by the master RM server to the client, e.g., which have been previously communicated in a response message, plus an additional X % additional amount of resources. In one embodiment, X is a predetermined value in the range of 2.5 to 15. In one embodiment, X=5. In this exemplary embodiment, in critical mode, the client is allowed to use at most the amount of resource group resources allocated to the client, e.g., which have previously been communicated to the client in a response message.

FIG. 15 is a drawing of an exemplary table 1500 used to describe an embodiment in which a cluster of SBCs has multiple resource groups and sets of those resource groups corresponding to different trunk groups (TGs). There is a determined mode of operation for each resource group. First column identifies the different resource groups; there is a first resource group, a second resource group, a third resource group, and a fourth resource group. Second column 1504 provides a description for each resource group. The first resource group is a call limit resources group which corresponds to TG A. The second resource group is a bandwidth resources group which corresponds to TG A. The third resource group is a call limit resources group which corresponds to TG B. The fourth resource group is a bandwidth resources group which corresponds to TG B. Third column 1506 indicates that there is a determined mode of operation, e.g., an independently determined mode of operation, for each of the four resource groups.

FIG. 16 is a drawing of an exemplary table 1600 corresponding to an SBC client mode for an exemplary embodiment in which the SBC receives mode information corresponding to two different resource type groups corresponding to the same trunk group, and determines a resource utilization reporting interval as a function of the mode information. First column 1602 lists the cluster mode of operation corresponding to the call limit resource group corresponding to TG A. Second column 1604 lists the cluster mode of operation corresponding to the bandwidth resource group corresponding to TG A. In this example, when cluster mode of operation for both the first and second resource groups are normal mode, then the reporting rate interval is the T second interval; otherwise, the reporting rate interval is the T/2 second interval. In various embodiments, the reporting rate interval is selected to be the reporting rate interval that would correspond to the highest reporting rate for any of the individual resource groups corresponding to the same trunk group based on mode, if each was taken on an individual basis.

Figure 17:
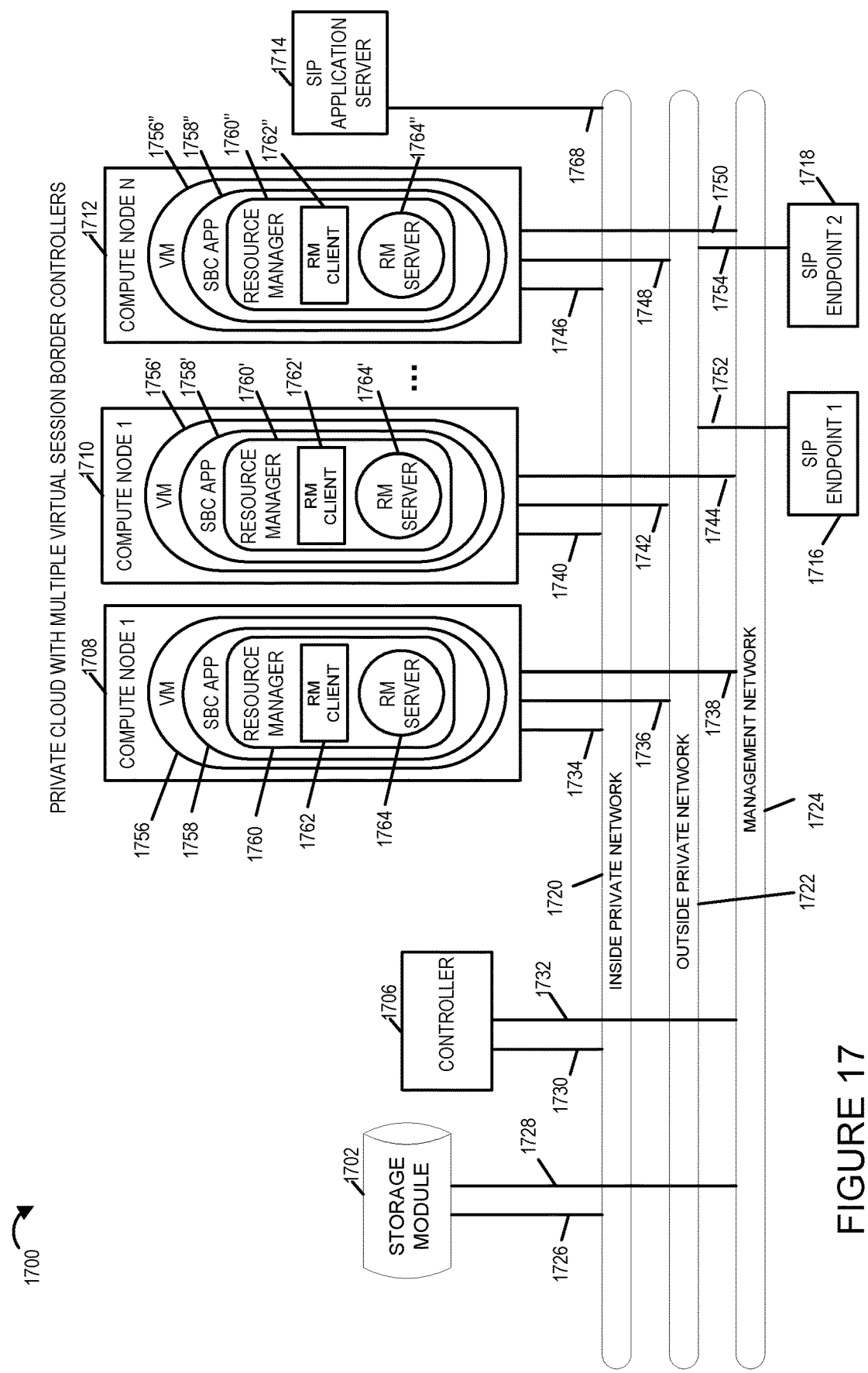
FIG. 17 is a drawing of an exemplary communications system including a private cloud with multiple virtual session border controllers in accordance with an exemplary embodiment.

FIG. 17 illustrates an exemplary private cloud system 1700 with multiple virtual session border controllers in accordance with an embodiment of the present invention. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as session border controllers.

The system includes a storage module 1702, a controller 1706, a plurality of compute nodes, a SIP application server 1714, a SIP endpoint device 1 1716, a SIP endpoint device 2 1718, a inside private communications network 1720, an outside private communications network 1722, a management network 1724, and a plurality of communications links 1726, 1728, 1730, 1732, 1734, 1736, 1738, 1740, 1742, 1744, 1746, 1748, 1750, 1752, 1754, and 1768. The inside private communications network 1720, the outside private communications network 1722, the management network 1724, and the plurality of communications links 1726, 1728, 1730, 1732, 1734, 1736, 1738, 1740, 1742, 1744, 1746, 1748, 1750, 1752, 1754, and 1768 are used to exchange messages, information and instructions between the various devices, endpoints, nodes and entities in the system.

The plurality of compute nodes includes a compute node 1 1708, a compute node 2 1710, . . . , a compute node N 1712 where N is a positive number. The compute node 1 includes a virtual machine 1756 and a session border controller (SBC) application 1758. A compute node running a session border controller application, e.g., SBC APP 1758, is a virtualized session border controller. Each of the compute nodes 2 1710, . . . , N 1712 include a virtual machine and a SBC application. The plurality of compute nodes 1, . . . , N executing software instructions to operate as a session border controller form a cluster of N SIP processing devices. When N=5, it forms a cluster of five virtual session border controllers similar to the five session border controllers of FIGS. 1 and 2. The resources, e.g., SIP processing capabilities, available to each of the virtual session border controllers may be, and typically is, different, for example based on how the virtual SBC is configured. The compute node 1 1708 is coupled to: the inside private network 1720 via communication link 1734, the outside private network 1722 via communications link 1736, and the management network 1724 via communications link 1738. The communications node 2 1710 is coupled to: the inside private network 1720 via communication link 1740, the outside private network 1722 via communications link 1742, and the management network 1724 via communications link 1744. The communications node N 1712 is coupled to: the inside private network 1720 via communication link 1746, the outside private network 1722 via communications link 1748, and the management network 1724 via communications link 1750.

The storage module 1702 is a storage device, e.g., memory, for storing instructions, information and data. The storage module 1702 is coupled to the inside private network 1720 via communications link 1726 and to the management network 1724 via communications network 1728.

The controller 1706 operates to configure and manage the private cloud system. The controller 1706 is coupled to the inside private network 1720 via communications link 1730 and the management network 1724 via communications link 1732. In some embodiments, the controller includes an orchestrator device or module, a Virtual Network Function manager device or module, and an element management system device or module. The orchestrator controls the orchestration and management of network function virtualized infrastructure and software resources, and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualisation of a network function. In this example, the virtualized network functions are session border controllers. The element management system or module performs management functions for one or several of the virtual network functions, e.g., virtual SBCs. Each compute node includes one or more processors. In some embodiments, one or more of the compute nodes in the system include a single processor upon which multiple virtual SBCs of the cluster are instantiated. In some embodiments, each virtual SBC of the cluster is a set of programming instructions forming a SBC application which is executed on a processor of a compute node.

The SIP application server 1714 is coupled to the inside private network 1720 via communications link 1768.

The SIP Endpoint device 1 1716 is coupled to the outside private network 1722 via communications link 1752. The SIP Endpoint 2 1718 is coupled to the outside private network 1722 via communications link 1754. In some embodiments, the system 1700 also includes a DNS server.

The methods and steps described in connection with any of FIG. 1-16 may also be implemented on the private cloud system 1700 of FIG. 17.

The virtual session border controllers are, e.g., a session border controllers implementing a method in accordance with flowchart 1000 of FIG. 10 and/or implemented in accordance with SBC 1100 of FIG. 11.

Each compute node (compute node 1 1708, compute node 2 110, . . . , computer node N 1712) includes a virtual machine (VM 1756, VM 1756', . . . , VM 1756"), respectively. Each of the virtual machines (VM 1756, VM 1756', . . . , VM 1756") includes a session border controller (SBC) application (SBC APP 1758, SBC APP 1758', . . . , SBC APP 1758"), respectively. Each session border controller (SBC) APPs (SBC APP 1758, SBC APP 1758', . . . , SBC APP 1758") includes a resource manager (resource manager 1760, resource manager 1760', . . . , resource manager 1760"), respectively. Each of the resource manager (resource manager 1760, resource manager 1760', . . . , resource manager 1760") includes a RM client and RM server ((RM client 1762, RM server 1764), (RM client 1762', RM server 1764'), (RM client 1762", RM server 1764"). In accordance with a feature of some embodiments, one of the resource managers (1760, 1760', . . . , 1760') is elected to serve as a current master resource manager for the cluster of SBCs (1758, 1758', . . . , 1758").

The RM server of a current master resource manager for a cluster of SBCs is an active RM server which performs operations including receiving resource utilization reporting messages from RM client modules of SBCs in the cluster, determining a mode of operation for a resource group corresponding to the cluster, allocating resource group resources to individual SBCs in the cluster, and generating and sending response messages to SBCs in the cluster, e.g., a response message communicating a determined cluster mode of operation corresponding to a resource group and an amount of allocated resources for an individual SBC client corresponding to the resource group. In at least some embodiments, the master RM server uses a different resource allocation method when in overshoot mode than the method used when in normal mode. Each SBC client (1762, 1762', . . . , 1762") is responsible for performing CAC checks. An SBC client generates and sends resource utilization reporting messages to the current master RM server of the cluster. An SBC client receives response messages from the master RM server of the cluster, e.g. a response message communicating a determined mode of operation and an amount of allocated resources for an individual SBC client. In various embodiments, the SBC client sends resource utilization reports at a rate which is a function of a determined mode of operation communicated from the master RM server, e.g., resource utilization reports are sent at a higher rate when in critical or overshoot mode than the rate used in normal mode. In some embodiments, a RM client is allowed to use more resources, e.g., X %, e.g., 5%, more resources, than the amount allocated by the master RM server to the RM client, when is normal mode, but is allowed to use at most the amount allocated to the RM client when in critical or overshoot mode.

LIST OF EXEMPLARY NUMBERED METHOD EMBODIMENTS

Method Embodiment 1

A method of managing resources in a communications system, the method comprising:
operating a first resource manager, of a first session border controller as a master resource manager, for a plurality of session border controllers in a cluster of session border controllers, said first session border controller being one of the plurality of session border controllers in said cluster, operating the first resource manager including:
receiving, at the first resource manager, resource utilization reporting messages from session border controllers in said cluster, said resource utilization reporting messages includes resource utilization information;
determining, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to first said resource manager at a faster rate than during said normal mode of operation and during which the session border controllers reject any resource allocation requests requesting resources in the first resource group that would require a resource allocation exceeding an allocation limit assigned to an individual session border controller performing a resource allocation; and
communicating the determined mode of operation for the first resource group to one or more session border controllers in said cluster.

Method Embodiment 2

The method of numbered method embodiment 1, further comprising:
determining, at the first resource manager, from the reported resource utilization information which of a plurality of session border controller modes of operation the session border controllers are to operate in for each of a plurality of different resource groups; and
communicating the determined modes of operation for the different resource groups to one or more session border controllers in said cluster.

Method Embodiment 3

The method of numbered method embodiment 2, wherein at least one of said first resource group and said different resource groups is a bandwidth resource group and another resource group is a number of calls which can be admitted resource group.

Method Embodiment 4

The method of numbered method embodiment 3, wherein the determined mode of operation for the first resource group is for a first trunk group, at least one SBC supporting multiple trunk groups (e.g., with different determined modes of operation being used for the first resource at different ones of the multiple trunk groups).

Method Embodiment 5

The method of numbered method embodiment 1, wherein during said normal mode of operation a session border controller can allocate resources above a resource allocation limit specified for the first resource group by the first resource manager for the individual session border controller performing the resource allocation.

Method Embodiment 6

The method of numbered method embodiment 5, wherein said plurality of session border controller modes of operation further includes an overshoot mode of operation wherein session border controllers report resource utilization reporting messages to the first resource manager more frequently than during said normal mode of operation and wherein the session border controllers are controlled to reject resource allocation requests above the resource allocation assigned to the session border controller.

Method Embodiment 7

The method of numbered method embodiment 6, wherein rejecting a resource allocation request includes denying a session initiation request (e.g., a call or video session initiation request).

Method Embodiment 8

The method of numbered method embodiment 6, further comprising:
  operating the first resource manager to determine a resource allocation for the first resource group for a session border controller in said cluster based on the reported resource utilization information.

Method Embodiment 9

The method of numbered method embodiment 8, wherein resources which are allocated are call admission resources; and
  wherein the messages reporting resource utilization include information indicating the number of active calls to which resources were allocated by the session border controller sending the resource utilization message to the first resource manager.

Method Embodiment 10

The method of numbered method embodiment 9, wherein a message reporting rate used during said critical and overshoot modes is at least twice (e.g., reporting interval is T/2) the message reporting rate used during said normal mode of SBC operation.

Method Embodiment 11

The method of numbered method embodiment 9, further comprising:
  operating the first resource manager to use a first resource allocation determination method to determine resource allocations for the first resource group for individual session border controllers during said normal mode of operation; and
  operating the first resource manager to use a second resource allocation determination method to determine resource allocations for the first resource group for individual session border controllers during said overshoot mode of operation.

Method Embodiment 12

The method of numbered method embodiment 11, wherein both the first and second resource allocation determination methods use information indicating the total first group resources being used by the cluster to determine resource allocation limits for individual session border controllers with respect to first group resources in the cluster.

Method Embodiment 13

The method of numbered method embodiment 12, wherein said second resource allocation determination method uses a factor (e.g., overshoot factor) to result in lower resource allocation limits for session border controllers than are set for a given total resource utilization than when the first resource allocation determination method is used.

Method Embodiment 14

The method of numbered method embodiment 13, wherein the first and second resource allocation determination methods allocate more first resource group resources to a session border controller in said cluster reporting a first level of first resource group resource utilization than to another session border controller in the cluster reporting a second lower level of first resource group resource utilization.

Method Embodiment 15

The method of numbered method embodiment 1, wherein each of the session border controllers includes a resource manager, the method further comprising:
  operating the session border controllers to elect one of the resource managers to operate as the master resource manager, said first resource manager having been elected to operate as the resource manager.

Method Embodiment 16

The method of numbered method embodiment 1, wherein the session border controllers in said cluster are instances of session border controllers in a cloud based system.

Method Embodiment 17

The method of numbered method embodiment 16, wherein an operator sets a total resource allocation for the first group resources that can be allocated (e.g., distributed) among the session border controllers.

Method Embodiment 18

The method of numbered method embodiment 15, wherein each session border controller corresponds to one or more trunk groups, resource allocations being performed on a per trunk group and resource group basis (e.g., there is one resource allocation for each of the different sets, e.g., groups, of resources used and shared by a trunk group at an SBC but an SBC can support multiple trunk groups which can and sometimes do have resources allocated separately).

LIST OF EXEMPLARY NUMBERED SYSTEM EMBODIMENTS

System Embodiment 1

A communications system comprising:
a first session border controller comprising:
 a processor; and
 memory;
 wherein said processor configured to
  operate a first resource manager, of the first session border controller as a master resource manager, for a plurality of session border controllers in a cluster of session border controllers, said first session border controller being one of the plurality of session border controllers in said cluster, operating the first resource manager including:
   receiving, at the first resource manager, resource utilization reporting messages from session border controllers in said cluster, said resource utilization reporting messages includes resource utilization information;
   determining, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to first said resource manager at a faster rate than during said normal mode of operation and during which the session border controllers reject any resource allocation requests requesting resources in the first resource group that would require a resource allocation exceeding an allocation limit assigned to an individual session border controller performing a resource allocation; and
   communicating the determined mode of operation for the first resource group to one or more session border controllers in said cluster.

System Embodiment 2

The communications system of numbered system embodiment 1, wherein said processor is further configured to:
 determine, at the first resource manager, from the reported resource utilization information which of a plurality of session border controller modes of operation the session border controllers are to operate in for each of a plurality of different resource groups; and
 communicate the determined modes of operation for the different resource groups to one or more session border controllers in said cluster.

System Embodiment 3

The communications system numbered system embodiment 2, wherein at least one of said first resource group and said different resource groups is a bandwidth resource group and another resource group is a number of calls which can be admitted resource group.

System Embodiment 4

The communications system of numbered system embodiment 3, wherein the determined mode of operation for the first resource group is for a first trunk group, at least one SBC supporting multiple trunk groups (e.g., with different determined modes of operation being used for the first resource at different ones of the multiple trunk groups).

System Embodiment 5

The communications system of numbered system embodiment 1, wherein during said normal mode of operation a session border controller can allocate resources above a resource allocation limit specified for the first resource group by the first resource manager for the individual session border controller performing the resource allocation.

System Embodiment 6

The communications system of numbered system embodiment 5, wherein said plurality of session border controller modes of operation further includes an overshoot mode of operation wherein session border controllers report resource utilization reporting messages to the first resource manager more frequently than during said normal mode of operation and wherein the session border controllers are controlled to reject resource allocation requests above the resource allocation assigned to the session border controller.

System Embodiment 7

The communications system of numbered system embodiment 6, wherein rejecting a resource allocation request includes denying a session initiation request (e.g., a call or video session initiation request).

System Embodiment 8

The communications system of numbered system embodiment 6, wherein said processor is further configured to:
 operate the first resource manager to determine a resource allocation for the first resource group for a session border controller in said cluster based on the reported resource utilization information.

System Embodiment 9

The communications system of numbered system embodiment 8, wherein resources which are allocated are call admission resources; and wherein the messages reporting resource utilization include information indicating the number of active calls to which resources were allocated by the session border controller sending the resource utilization message to the first resource manager.

System Embodiment 10

The communications system of numbered system embodiment 9, wherein a message reporting rate used during said critical and overshoot modes is at least twice (e.g., reporting interval is T/2) the message reporting rate used during said normal mode of SBC operation.

System Embodiment 11

The communications system of numbered system embodiment 9, wherein said processor is further configured to:
operate the first resource manager to use a first resource allocation determination method to determine resource allocations for the first resource group for individual session border controllers during said normal mode of operation; and
operating the first resource manager to use a second resource allocation determination method to determine resource allocations for the first resource group for individual session border controllers during said overshoot mode of operation.

System Embodiment 12

The communications system of numbered system embodiment 11, wherein both the first and second resource allocation determination methods use information indicating the total first group resources being used by the cluster to determine resource allocation limits for individual session border controllers with respect to first group resources in the cluster.

System Embodiment 13

The communications system of numbered system embodiment 12, wherein said second resource allocation determination method uses a factor (e.g., overshoot factor) to result in lower resource allocation limits for session border controllers than are set for a given total resource utilization than when the first resource allocation determination method is used.

System Embodiment 14

The communications system of numbered system embodiment 13, wherein the first and second resource allocation determination methods allocate more first resource group resources to a session border controller in said cluster reporting a first level of first resource group resource utilization than to another session border controller in the cluster reporting a second lower level of first resource group resource utilization.

System Embodiment 15

The communications system of numbered system embodiment 1, wherein said first processor is configured to participate to elect a resource manager of one resource managers of the session border controllers of the cluster to operate as the master resource manager, said first resource manager having been elected to operate as the resource manager.

System Embodiment 16

The communications system of numbered system embodiment 1, wherein the session border controllers in said cluster are instances of session border controllers in a cloud based system.

System Embodiment 17

The communications system of numbered system embodiment 12, wherein an operator sets a total resource allocation for the first group resources that can be allocated (e.g., distributed) among the session border controllers.

System Embodiment 18

The communications system of numbered system embodiment 15, wherein each session border controller corresponds to one or more trunk groups, resource allocations being performed on a per trunk group and resource group basis (e.g., there is one resource allocation for each of the different sets, e.g., groups, of resources used and shared by a trunk group at an SBC but an SBC can support multiple trunk groups which can and sometimes do have resources allocated separately).

Another embodiment of the invention includes a non-transitory machine readable medium including processor executable instructions, which when executed by a processor of a first session border controller control the first session border controller to:
operate a first resource manager, of the first session border controller as a master resource manager, for a plurality of session border controllers in a cluster of session border controllers, said first session border controller being one of the plurality of session border controllers in said cluster, operating the first resource manager including:
receive, at the first resource manager, resource utilization reporting messages from session border controllers in said cluster, said resource utilization reporting messages includes resource utilization information;
determine, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to first said resource manager at a faster rate than during said normal mode of operation and during which the session border controllers reject any resource allocation requests requesting resources in the first resource group that would require a resource allocation exceeding an allocation limit assigned to an individual session border controller performing a resource allocation; and
communicate the determined mode of operation for the first resource group to one or more session border controllers in said cluster.

Various aspects and/or features of some embodiments are discussed below. In at least some embodiments the first resource manager is the SBC in a group which was elected to serve as the master SBC with respect to resource allocation. The master may, and sometimes does, allocate, e.g., distribute, the full set of available resources between SBCs. The individual SBCs then allocate the resources in accordance with the invention and, in some embodiments, depending on the mode of operation with respect to a resource group. The allocations are made in some embodiments on a per trunk group basis but other groupings are possible. In at least one particular exemplary embodiment a mode of operation for different resource groups that may be used by the trunk group is determined by the resource manager of the master SBC and mode of operation information is communicated to the individual SBCs in the SBC group for which the resource allocation is made, e.g., as part of a response to one or more messages reporting resource utilization at an SBC. The mode of operation determined for a resource group in some embodiments will affect the rate at which resource utilization messages are sent for the particular resource group to which the determined mode corresponds and, in some cases, how an SBC will operate with regard to resource allocation for the resource group, e.g., with respect to the trunk group and resource group to which the mode of operation corresponds. While the reporting rate of resource utilization information for a particular resource group depends in some embodiments on the mode of operation associated with the resource group, in some embodiments resource utilization information is included for multiple resource groups in each resource utilization message sent to the master SBC. Assuming the resource allocations are on a per trunk group basis, and resource utilization information for multiple resource groups is included in an individual resource utilization reporting message, the rate of such resource utilization reporting messages for a trunk group will be determined by mode of the resource group having the highest reporting rate as controlled by the determined mode of operation communicated to the SBC for the trunk group. Thus, if a first resource group for a first trunk group at an SBC has a determined mode of operation which requires a first, faster reporting rate, than a second, slower rate, for a second resource group corresponding to the first trunk group, the SBC will report resource utilization messages for the first trunk group at the first rate and may include in the resource utilization message for the first trunk group the current resource utilization information for both the first resource group and, optionally, the second resource group. A second trunk group at the SBC having a different mode of operation with respect to the first resource group may and sometimes will report resource utilizations message for the second trunk group at a different rate than for the first trunk group.

Additional features and/or benefits of some, but not necessarily all, embodiments are discussed below. An exemplary resource allocation method, in accordance with some embodiments of the present invention, used in normal state, sometimes referred to as normal mode, actually distributes the complete resources with the master/leader RM (SBC) allocating portions of the completer resources to each of the SBCs in the cluster. The SBCs (RM Clients) which request more resources, or indicate higher resource usage, or indicate potentially higher resource usage than resource allocation, may, and sometimes do, get more allocation from the master RM Server (master/leader). An exemplary method, in accordance with some embodiments of the present invention, can be used to distribute many kinds of resources, e.g., call limit, bandwidth, licenses etc. An exemplary method, in accordance with some embodiments of the present invention, takes care of cloud scale in and scale out cases. An exemplary method, in accordance with some embodiments of the present invention, also has support for High Availability. For example, if RM Server, which is the master, goes down, a new RM Server will get elected to operate as the new master for the cluster of SBCs and each of the SBCs (RM clients) in the cluster will connect to new master RM server and will report their current usage and will receive corresponding allocation. If a SBC (RM Client) goes down and Standby comes, the new Active will connect to the master RM Server and will report its current usage and will receive allocation. An exemplary method, in accordance with some embodiments of the present invention, also considers rejected calls count, e.g., in determining resource allocations. This approach of utilizing rejected call counts helps in doing proper resource allocation from the master RM server to the client SBCs which most need the resources. An exemplary method, in accordance with some embodiments, does not introduce any latency to call processing. An exemplary method, in accordance with some embodiments, makes minimal intra cloud messages for CAC control messages. An exemplary method, in accordance with some embodiments, works with random load with the same accuracy as it works with uniform load. An exemplary method, in accordance with some embodiments, does not include any broadcasting for CAC. An exemplary method, in accordance with some embodiments, does not increase intra Cloud CAC control messages when either load or TG numbers increases. However, there is a messaging increase, which is constant when there is a change from the T second reporting interval to the T/2 sec reporting interval based on a mode change. An exemplary method, in accordance with some embodiments, does not take into consideration the number of calls per second (cps) per TG; hence increasing or decreasing cps will not affect the method's performance.

The techniques of various embodiments may be implemented using software, hardware and/or a combination of software and hardware. Various embodiments are directed to apparatus, e.g., a session border controller, a gateway, a switch, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, determining a mode of operation, determining a resource allocation, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller, a gateway, a switch, etc., including a processor configured to implement one, multiple or all of the steps of one or more methods of the invention.

In some embodiments, the processor or processors, e.g., CPUs, of one or more devices, e.g., of the communications device, e.g., a session border controller, a gateway, a switch, etc., are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, a gateway, a switch, etc., with a processor which includes a module corresponding to each of the steps of the various described methods performed by the device in which the processor is included. In some, but not all embodiments, an apparatus, e.g., a communications device, e.g., a session border controller, a gateway, a switch, etc., includes a module corresponding to each of the steps of the various described methods performed by the device in which the processor is included. The modules may be implemented using software and/or hardware.

Various embodiments, are directed to communications systems including clusters of communications devices, e.g., clusters of session border controllers, clusters of gateways, clusters of switches, e.g., in a cloud. Various embodiments are directed to efficiently managing communications resources used by a cluster of devices, e.g. clusters of session border controllers, clusters of gateways, clusters of switches, e.g., in a cloud.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller, a gateway, a switch, etc. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of managing resources in a communications system, the method comprising:
    operating a first resource manager, of a first session border controller, as a master resource manager for a plurality of session border controllers in a cluster of session border controllers, said first session border controller being one of the plurality of session border controllers in said cluster, operating the first resource manager including:
    receiving, at the first resource manager, resource utilization reporting messages from session border controllers in said cluster, said resource utilization reporting messages including resource utilization information;
    determining, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and a critical mode of operation in which session border controllers in said cluster communicate resource utilization reporting messages for the first resource group to said first resource manager at a faster rate than during said normal mode of operation and during which the session border controllers reject any resource allocation requests requesting resources in the first resource group that would require a resource allocation exceeding an allocation limit assigned to an individual session border controller performing a resource allocation;
    wherein said normal mode of operation is determined when the reported resource utilization for the first resource group is below or equal to a first threshold and said critical mode of operation is determined when the reported resource utilization for the first resource group is above the first threshold;
    wherein during said normal mode of operation a session border controller can allocate resources above a resource allocation limit specified for the first resource group by the first resource manager for the individual session border controller performing the resource allocation; and
    communicating the determined mode of operation for the first resource group to one or more session border controllers in said cluster.

2. The method of claim 1, wherein said plurality of session border controller modes of operation further includes an overshoot mode of operation wherein session border controllers report resource utilization reporting messages to the first resource manager more frequently than during said normal mode of operation and wherein the session border controllers are controlled to reject resource allocation requests above the resource allocation assigned to the session border controller.

3. The method of claim 2, further comprising:
operating the first resource manager to determine a resource allocation for the first resource group for a session border controller in said cluster based on the reported resource utilization information;
wherein resources which are allocated are call admission resources; and
wherein the messages reporting resource utilization include information indicating the number of active calls to which resources were allocated by the session border controller sending the resource utilization message to the first resource manager.

4. The method of claim 3, wherein a message reporting rate used during said critical and overshoot modes is at least twice the message reporting rate used during said normal mode of session border controller operation.

5. The method of claim 3, further comprising:
operating the first resource manager to use a first resource allocation determination method to determine resource allocations for the first resource group for individual session border controllers during said normal mode of operation; and
operating the first resource manager to use a second resource allocation determination method to determine resource allocations for the first resource group for individual session border controllers during said overshoot mode of operation.

6. The method of claim 5, wherein both the first and second resource allocation determination methods use information indicating the total first group resources being used by the cluster to determine resource allocation limits for individual session border controllers with respect to first group resources in the cluster.

7. The method of claim 6, wherein said second resource allocation determination method uses a factor to result in lower resource allocation limits for session border controllers for a given total resource utilization than when the first resource allocation determination method is used.

8. The method of claim 7, wherein the first and second resource allocation determination methods allocate more first resource group resources to a session border controller in said cluster reporting a first level of first resource group resource utilization than to another session border controller in the cluster reporting a second level of first resource group resource utilization, said second level being lower than said first level.

9. The method of claim 1, further comprising:
determining, by the first resource manager, that an overshoot condition exists for the cluster when the reported resource utilization information indicates that a maximum resource limit for the first resource group has been exceeded by the cluster of session border controllers; and
wherein said plurality of session border controller modes of operation further includes an overshoot mode of operation wherein the session border controllers report resource utilization reporting messages to the first resource manager more frequently than during said normal mode of operation and wherein the session border controllers are controlled to reject resource allocation requests above the resource allocation assigned to the session border controller, said resource allocation assigned to the session border controller being an overshoot resource allocation determined using an overshoot factor by the first resource manager after determining that an overshoot condition exists for the cluster.

10. The method of claim 9, further comprising:
operating the first resource manager to determine a resource allocation for the first resource group for each of the session border controllers in said cluster based on the reported resource utilization information; and
operating each of the session border controllers in the cluster to receive and respond to requests for resources of the first resource group.

11. The method of claim 1, wherein each of the session border controllers includes a resource manager, the method further comprising:
operating the session border controllers to elect one of the resource managers to operate as the master resource manager, said first resource manager having been elected to operate as the master resource manager.

12. The method of claim 11, wherein each session border controller corresponds to one or more trunk groups, resource allocations being performed on a per trunk group and resource group basis.

13. The method of claim 1, wherein the session border controllers in said cluster are instances of session border controllers in a cloud based system.

14. A communications system comprising:
a first session border controller comprising:
a processor; and
memory;
wherein said processor is configured to:
operate a first resource manager, of the first session border controller, as a master resource manager for a plurality of session border controllers in a cluster of session border controllers, said first session border controller being one of the plurality of session border controllers in said cluster, operating the first resource manager including:
receiving, at the first resource manager, resource utilization reporting messages from session border controllers in said cluster, said resource utilization reporting messages including resource utilization information;
determining, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to said first resource manager at a faster rate than during said normal mode of operation and during which the session border controllers reject any resource allocation requests requesting resources in the first resource group that would require a resource allocation exceeding an allocation limit assigned to an individual session border controller performing a resource allocation;

wherein said normal mode of operation is determined when the reported resource utilization for the first resource group is below or equal to a first threshold and said critical mode of operation is determined when the reported resource utilization for the first resource group is above the first threshold;

wherein during said normal mode of operation a session border controller can allocate resources above a resource allocation limit specified for the first resource group by the first resource manager for the individual session border controller performing the resource allocation; and communicating the determined mode of operation for the first resource group to one or more session border controllers in said cluster.

15. The communications system of claim 14,
wherein the processor further operates the first resource manager to determine from the reported resource utilization information which of a plurality of session border controller modes of operation the session border controllers of the cluster are to operate in for a second resource group which is different from said first resource group, said plurality of session border controller modes of operation including a normal mode of operation for the second resource group and a critical mode of operation for the second resource group; and wherein said normal mode of operation for the second resource group is determined when the reported resource utilization for the second resource group is below or equal to a second threshold and said critical mode of operation for the second resource group is determined when the reported resource utilization for the second resource group is above the second threshold.

16. The communications system of claim 14, wherein said plurality of session border controller modes of operation further includes an overshoot mode of operation wherein session border controllers report resource utilization reporting messages to the first resource manager more frequently than during said normal mode of operation and wherein the session border controllers are controlled to reject resource allocation requests above the resource allocation assigned to the session border controller.

17. The communications system of claim 16, wherein said processor is further configured to:
operate the first resource manager to determine a resource allocation for the first resource group for a session border controller in said cluster based on the reported resource utilization information.

18. The communications system of claim 17, wherein resources which are allocated are call admission resources; and
wherein the messages reporting resource utilization include information indicating the number of active calls to which resources were allocated by the session border controller sending the resource utilization message to the first resource manager.

19. The communications system of claim 14, wherein the session border controllers in said cluster are instances of session border controllers in a cloud based system.

20. A non-transitory machine readable medium including processor executable instructions, which when executed by a processor of a first session border controller control the first session border controller to:
operate a first resource manager, of the first session border controller, as a master resource manager for a plurality of session border controllers in a cluster of session border controllers, said first session border controller being one of the plurality of session border controllers in said cluster, operating the first resource manager including:
receive, at the first resource manager, resource utilization reporting messages from session border controllers in said cluster, said resource utilization reporting messages including resource utilization information;
determine, at the first resource manager, from the reported resource utilization information which of a plurality of session border controller modes of operation the session border controllers are to operate in for a first resource group, said plurality of modes of session border controller operation for the first resource group including at least: i) a normal mode of operation in which session border controllers in the cluster report resource utilization for the first resource group to the first resource manager at fixed time interval spacing T and ii) a critical mode of operation in which session border controllers in said cluster communicate resource utilization reporting messages for the first resource group to said first resource manager at a faster rate than during said normal mode of operation and during which the session border controllers reject any resource allocation requests requesting resources in the first resource group that would require a resource allocation exceeding an allocation limit assigned to an individual session border controller performing a resource allocation;
wherein said normal mode of operation is determined when the reported resource utilization for the first resource group is below or equal to a first threshold and said critical mode of operation is determined when the reported resource utilization for the first resource group is above the first threshold;
wherein during said normal mode of operation a session border controller can allocate resources above a resource allocation limit specified for the first resource group by the first resource manager for the individual session border controller performing the resource allocation; and
communicate the determined mode of operation for the first resource group to one or more session border controllers in said cluster.

* * * * *